US006185184B1

(12) United States Patent
Mattaway et al.

(10) Patent No.: US 6,185,184 B1
(45) Date of Patent: Feb. 6, 2001

(54) DIRECTORY SERVER FOR PROVIDING DYNAMICALLY ASSIGNED NETWORK PROTOCOL ADDRESSES

(75) Inventors: Shane D. Mattaway, Boca Raton; Glenn W. Hutton, Miami; Craig B. Strickland, Tamarac; Scott Allen Thompson, Sunrise, all of FL (US)

(73) Assignee: NetSpeak Corporation, Boca Raton, FL (US)

( * ) Notice: Under 35 U.S.C. 154(b), the term of this patent shall be extended for 0 days.

(21) Appl. No.: 08/719,894

(22) Filed: Sep. 25, 1996

Related U.S. Application Data

(63) Continuation-in-part of application No. 08/533,115, filed on Sep. 25, 1995, now Pat. No. 6,108,704.
(60) Provisional application No. 60/025,415, filed on Sep. 4, 1996, and provisional application No. 60/024,251, filed on Aug. 21, 1996.

(51) Int. Cl.[7] ............................ G01R 31/08; G06F 11/00; G08C 15/00; H04J 1/16
(52) U.S. Cl. ...................... 370/230; 370/352; 709/203; 709/224
(58) Field of Search ................................. 370/352, 353, 370/354, 355, 356, 230, 235; 395/200.53, 200.54, 200.55, 200.6; 709/201, 203, 223, 224

(56) References Cited

U.S. PATENT DOCUMENTS

| 5,095,480 | 3/1992 | Fenner . |
| 5,150,360 | 9/1992 | Perlman et al. . |
| 5,166,931 | 11/1992 | Riddle . |
| 5,204,669 | 4/1993 | Dorfe et al. . |
| 5,224,095 | 6/1993 | Woest et al. . |

(List continued on next page.)

FOREIGN PATENT DOCUMENTS

| 0445402 | 11/1991 | (EP) . |
| 0556012 | 8/1993 | (EP) . |
| WO 9219054 | 10/1992 | (WO) . |

OTHER PUBLICATIONS

Comer, Douglas E., "Internetworking with TCP/IP". vol. 1, 2nd ed. Principles, Protocols and Architecture.
www.cox.smu.edu/class/mis6386/people/stort/iphone25.exe, VocalTec Internet Phone Version 2.5, Feb., 1995.

(List continued on next page.)

*Primary Examiner*—Ajit Patel
*Assistant Examiner*—Bob A. Phunkulh
(74) *Attorney, Agent, or Firm*—Kudirka & Jobse, LLP

(57) ABSTRACT

A communication protocol for establishing real-time, point-to-point communications between computer users over a computer network includes a directory server apparatus for providing the current dynamically assigned Internet Protocol addresses of client processes currently connected to the computer network. The server maintains a list of entries, each entry including the Internet Protocol address of a user currently connected to the network. In response to identification of one of the entries by a requesting client process, the server provides the corresponding Internet Protocol address of the entry to the requesting client process. In accordance with a second aspect of the present invention, the directory server monitors the status of client processes connected to the network via periodic notification from the client processes. The server dynamically modifies the time interval at which client processes notify the server, depending on the demand for server resources.

16 Claims, 21 Drawing Sheets

U.S. PATENT DOCUMENTS

| | | | |
|---|---|---|---|
| 5,249,290 | * | 9/1993 | Heizer .................................. 709/105 |
| 5,291,554 | | 3/1994 | Morales . |
| 5,309,433 | | 5/1994 | Cidon et al. . |
| 5,309,437 | | 5/1994 | Perlman et al. . |
| 5,321,813 | | 6/1994 | McMillen et al. . |
| 5,357,571 | | 10/1994 | Banwart . |
| 5,400,335 | | 3/1995 | Yamada . |
| 5,425,028 | | 6/1995 | Britton et al. . |
| 5,430,709 | | 7/1995 | Galloway . |
| 5,430,727 | | 7/1995 | Callon . |
| 5,432,846 | | 7/1995 | Norio . |
| 5,434,797 | | 7/1995 | Barris . |
| 5,442,633 | | 8/1995 | Perkins et al. . |
| 5,452,296 | | 9/1995 | Shimizu . |
| 5,455,854 | | 10/1995 | Dilts et al. . |
| 5,457,683 | | 10/1995 | Robins . |
| 5,457,738 | | 10/1995 | Sylvan . |
| 5,463,625 | | 10/1995 | Yasrebi . |
| 5,465,286 | | 11/1995 | Clare et al. . |
| 5,469,500 | | 11/1995 | Satter et al. . |
| 5,475,741 | | 12/1995 | Davis et al. . |
| 5,479,411 | | 12/1995 | Klein . |
| 5,509,058 | | 4/1996 | Sestak et al. . |
| 5,517,494 | | 5/1996 | Green . |
| 5,524,110 | | 6/1996 | Danneels et al. . |
| 5,524,141 | | 6/1996 | Braun et al. . |
| 5,524,254 | | 6/1996 | Morgan et al. . |
| 5,526,489 | | 6/1996 | Nilakantan et al. . |
| 5,533,110 | | 7/1996 | Pinard et al. . |
| 5,544,303 | | 8/1996 | Maroteaux et al. . |
| 5,546,582 | | 8/1996 | Brockmeyer et al. . |
| 5,581,552 | | 12/1996 | Civanlar et al. . |
| 5,608,786 | | 3/1997 | Gordon . |
| 5,684,951 | * | 11/1997 | Goldman et al. .................. 713/202 |
| 5,740,231 | | 4/1998 | Chon et al. . |
| 5,751,961 | * | 5/1998 | Smyk .................................. 709/217 |
| 5,812,819 | * | 8/1998 | Rodwin et al. ................. 395/500.44 |
| 5,835,720 | * | 11/1998 | Nelson et al. ..................... 709/224 |
| 5,835,725 | * | 11/1998 | Chiang et al. ..................... 709/228 |
| 5,854,901 | * | 12/1998 | Cole et al. ......................... 709/245 |
| 5,956,482 | * | 9/1999 | Agraharam et al. ............... 345/326 |

OTHER PUBLICATIONS

Weinburg, Netscape Conference and Cooltalk Meeting Room, 222.15.com, Feb. 22, 1996.

Gull, Getting IP Address of PPP–Connected Mac. <jgull–0304951005350001@pm012–11.dialip.mich.net>, Apr., 3, 1995.

Gull, "Internet Phone for Mac?", jgull–170495011645001@pm049–28.dialip.mich.net>, Apr. 17, 1995.

December & Randall, "The World Wide Web Unleased", Sams Publishing, Indianapolis, IN, 1994, pp. 3–24. Dec. 1994.

Heylighen, "WorldWideWeb: a distributed hypermedia paradigm for global networking", IEE/INSPEC Database Updates and Addiotions (1960–19950 Doc.# 1374618: Proceedings SHARE Spring Conference, Apr. 1994.

Internetworking with TCP/IP, vol. I, Second Edition, *Principles. Protocols. and Architecture*, by Douglas E. Comer, cover pageand pp. vii–xviii, 1–3, 17–19 and 311–333.

* cited by examiner

DIRECTORY SERVER FOR PROVIDING DYNAMICALLY ASSIGNED NETWORK PROTOCOL ADDRESSES

RELATED APPLICATIONS

This application is a continuation-in-part of U.S. patent application Ser. No. 08/533,115 entitled Point-to-Point Internet Protocol, by Glenn W. Hutton, filed Sep. 25, 1995, now U.S. Pat. No. 6,108,704 commonly assigned, the subject matter of which is incorporated herein by reference.

To the extent that any matter contained herein is not already disclosed in the above-identified parent this application claims priority to U.S. provisional patent application Ser. No. 60/025,415 entitled Internet Telephony Apparatus and Method by Mattaway et al., filed Sep. 4, 1996, and U.S. provisional patent application Ser. No. 60/024,251 entitled System and Methods for Point-To-Point Communications Over a Computer Network, by Mattaway et al., filed Aug. 21, 1996.

In addition, this application is one of a number of related applications filed on an even date herewith and commonly assigned, the subject matters of which are incorporated herein by reference, including the following:

U.S. patent application Ser. No. 08/721,316, entitled Graphic User Interface For Internet Telephony Application, now U.S. Pat. No. 6,009,469 by Mattaway et al.;

U.S. patent application Ser. No. 08/719,554, entitled Point-to-point Computer Network Communication Utility Utilizing Dynamically Assigned Network Protocol Addresses, now U.S. Pat. No. 6,131,121 by Mattaway et al.;

U.S. patent application Ser. No. 08/719,640, entitled Method And Apparatus For Dynamically Defining Data Communication Utilities, now pending by Mattaway et al.;

U.S. patent application Ser. No. 08/719,891, entitled Method And Apparatus For Distribution And Presentation Of Multimedia Data Over A Computer Network, now pending by Mattaway et al.;

U.S. patent application Ser. No. 08/719,898, entitled Method And Apparatus For Providing Caller Identification Based Out-going Messages In A Computer Telephony Environment, now pending by Mattaway et al.;

U.S. patent application Ser. No. 08/718,911, entitled Method And Apparatus For Providing Caller Identification Based Call Blocking In A Computer Telephony Environment, now pending by Mattaway et al.; and U.S. patent application Ser. No. 08/719,639, entitled Method And Apparatus For Providing Caller Identification Responses In A Computer Telephony Environment, by now pending Mattaway et al.

FIELD OF THE INVENTION

The present invention relates, in general, to data processing systems, and more specifically, to a method and apparatus for facilitating audio communications over computer networks.

BACKGROUND OF THE INVENTION

The increased popularity of on-line services such as AMERICA ONLINE™, COMPUSERVE®, and other services such as Internet gateways have spurred applications to provide multimedia, including video and voice clips, to online users. An example of an online voice clip application is VOICE E-MAIL FOR WINCIM and VOICE E-MAIL FOR AMERICA ONLINE™, available from Bonzi Software, as described in "Simple Utilities Send Voice E-Mail Online", MULTIMEDIA WORLD, VOL. 2, NO. 9, August 1995, p. 52. Using such Voice E-Mail software, a user may create an audio message to be sent to a predetermined E-mail address specified by the user.

Generally, devices interfacing to the Internet and other online services may communicate with each other upon establishing respective device addresses. One type of device address is the Internet Protocol (IP) address, which acts as a pointer to the device associated with the IP address. A typical device may have a Serial Line Internet Protocol or Point-to-Point Protocol (SLIP/PPP) account with a permanent IP address for receiving E-mail, voicemail, and the like over the Internet. E-mail and voicemail is generally intended to convey text, audio, etc., with any routing information such as an IP address and routing headers generally being considered an artifact of the communication, or even gibberish to the recipient.

Devices such as a host computer or server of a company may include multiple modems for connection of users to the Internet, with a temporary IP address allocated to each user. For example, the host computer may have a general IP address "XXX.XXX.XXX," and each user may be allocated a successive IP address of XXX.XXX.XXX.10, XXX.XXX.XXX.11, XXX.XXX.XXX.12, etc. Such temporary IP addresses may be reassigned or recycled to the users, for example, as each user is successively connected to an outside party. For example, a host computer of a company may support a maximum of 254 IP addresses which are pooled and shared between devices connected to the host computer.

Permanent IP addresses of users and devices accessing the Internet readily support point-to-point communications of voice and video signals over the Internet. For example, real-time video teleconferencing has been implemented using dedicated IP addresses and mechanisms known as reflectors. Due to the dynamic nature of temporary IP addresses of some devices accessing the Internet, point-to-point communications in real-time of voice and video have been generally difficult to attain.

The ability to locate, users having temporary or dynamically assigned Internet Protocol address has been difficult without the user manually initiating the communication. Accordingly, spontaneous, real-time communications with such users over computer networks have been impractical. Further, even if the dynamically assigned Internet Protocol address of a user was obtained, it is difficult to monitor whether the client is still coupled to the computer network and whether the dynamically assigned Internet Protocol address is still valid. As such, computer users typically have little more information about a party than the E-address, name, alias, or telephone number of the party, with no knowledge of whether the party is currently connected to the Internet or the dynamically assigned Internet Protocol address of the party.

Accordingly, a need exists for a way to determine whether computer users are actively connected to a computer network.

A further need exists for a way to obtain the dynamically assigned Internet Protocol address of a user; having on-line status with respect to a computer network, particularly the Internet.

An even further need exists for a method and apparatus by which to locate users with identifiers which are familiar to a computer user such as an E-mail address, name, alias, telephone number, etc.

SUMMARY OF THE INVENTION

The above deficiencies in the prior art and the previously described needs are fulfilled by the present invention which provides, a directory server utility for providing the dynamically assigned network protocol addresses of client processes currently coupled to the computer network. Accordingly to one embodiment of the present invention, a method of locating users having dynamically assigned network protocol addresses comprises the steps of maintaining a compilation of entries, each entry comprising a network protocol address of a client process connected to the computer network, and, in response to identification of one of the entries by a requesting client process, providing the network protocol address of the identified entry to the requesting client process.

According to another embodiment of the present invention, a computer program product, for use with a computer server operatively coupled over a computer network to one or more client processes, comprises a computer useable medium having program code means for maintaining a compilation of entries, each entry comprising the network protocol address of a client process. Program code means, responsive to identification of one of the entries by a requesting client process, provide the network protocol address associated with the entry to the requesting client process.

In accordance with another aspect of the present invention, a server monitors the status of multiple client processes actively connected to the computer network with a method comprising the steps of receiving notification from a client process that the client process is active, and, determining that the client process is inactive if a subsequent notification is not received within a predetermined time interval. The method further contemplates the steps of modifying the predetermined time interval depending on utilization of server resources.

BRIEF DESCRIPTION OF THE DRAWINGS

The features of the Invention will become more readily apparent and may be better understood by referring to the following detailed description of an illustrative embodiment of the present invention, taken in conjunction with the accompanying drawings, in which.

DETAILED DESCRIPTION

Figure 1:
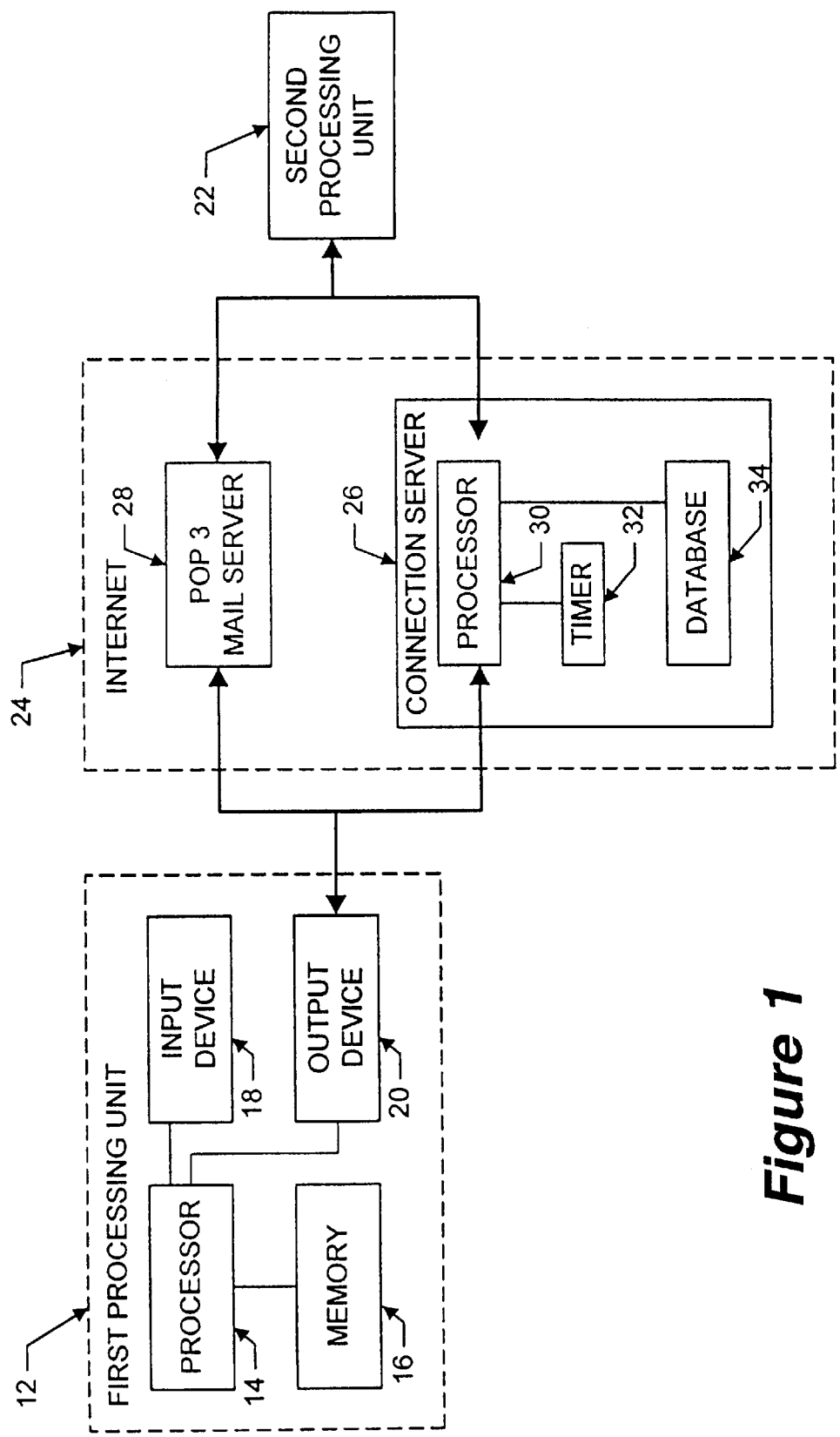
FIG. 1 illustrates, in block diagram format, a system for the disclosed point-to-point Internet protocol.

Referring now in specific detail to the drawings, with like reference numerals identifying similar or identical elements, as shown in FIG. 1, the present disclosure describes a point-to-point network protocol and system 10 for using such a protocol.

In an exemplary embodiment, the system 10 includes a first processing unit 12 for sending at least a voice signal from a first user to a second user. The first processing unit 12 includes a processor 14, a memory 16, an input device 18, and an output device 20. The output device 20 includes at least one modem capable of, for example, 14.4Kilobit-per-second communications and operatively connected via wired and/or wireless communication connections to the Internet or other computer networks such as an Intranet, i.e., a private computer network. One skilled in the art would understand that the input device 18 may be implemented at least in part by the modem of the output device 20 to allow input signals from the communication connections to be received. The second processing unit 22 may have a processor, memory, and input and output devices, including at least one modem and associated communication connections, as described above for the first processing unit 12. In an exemplary embodiment, each of the processing units 12, 22 may execute the WEBPHONE® Internet telephony application available from NetSpeak Corporation, Boca Raton, Fla., which is capable of performing the disclosed point-to-point Internet protocol and system 10, as described herein.

The first processing unit 12 and the second processing unit 22 are operatively connected to the Internet 24 by communication devices and software known in the art, such as an Internet Service Provider (ISP) or an Internet gateway. The processing units 12, 22 may be operatively interconnected through the Internet 24 to a connection server 26, and may also be operatively connected to a mail server 28 associated with the Internet 24.

The connection server 26 includes a processor 30, a timer 32 for generating time stamps, and a memory such as a database 34 for storing, for example, E-mail and Internet Protocol (IP) addresses of logged-in units. In an exemplary embodiment, the connection server 26 may be a SPARC 5 server or a SPARC 20 server, available from SUN MICROSYSTEMS, INC., Mountain View, Calif., having a central processing unit (CPU) as processor 30, an operating system (OS) such as UNIX, for providing timing operations such as maintaining the timer 32, a hard drive or fixed drive, as well as dynamic random access Memory (DRAM) for storing the database 34, and a keyboard and display and/or other input and output devices (not shown in FIG. 1). The database 34 may be an SQL database available from ORACLE or INFORMIX.

In an exemplary embodiment, the mail server 28 may be implemented with a Post Office Protocol (POP) Version 3 mail server and the Simple Mail Transfer Protocol (SMTP), including a processor, memory, and stored programs operating in a UNIX environment, or, alternatively, another OS, to process E-mail capabilities between processing units and devices over the Internet 24.

In the illustrative embodiment, the POP protocol is utilized to retrieve E-mail messages from mail server 28 while the SMTP protocol is used to submit E-mail message to Internet 24.

The first processing unit 12 may operate the disclosed point-to-point Internet protocol by a computer program described hereinbelow in conjunction with FIG. 6, which may be implemented from compiled and/or interpreted source code in the C++ programming language and which may be downloaded to the first processing unit 12 from an external computer. The operating computer program may be stored in the memory 16, which may include about 8 MB RAM and/or a hard or fixed drive having about 8 MB of available memory. Alternatively, the source code may be implemented in the first processing unit 12 as firmware, as an erasable read only memory (EPROM), etc. It is understood that one skilled in the art would be able to use programming languages other than C++ to implement the disclosed point-to-point network protocol and system 10.

The processor 14 receives input commands and data from a first user associated with the first processing unit 12 though the input device 18, which may be an input port connected by a wired, optical, or a wireless connection for electromagnetic transmissions, or alternatively may be transferable storage media, such as floppy disks, magnetic tapes, compact disks, or other storage media including the input data from the first user.

The input device 18 may include a user interface (not shown) having, for example, at least one button actuated by the user to input commands to select from a plurality of operating modes to operate the first processing unit 12. In alternative embodiments, the input device 18 may include a keyboard, a mouse, a touch screen, and/or a data reading device such as a disk drive for receiving the input data from input data files stored in storage media such as a floppy disk or, for example, an 8 mm storage tape. The input device 18 may alternatively include connections to other computer systems to receive the input commands and data therefrom.

The first processing unit 12 may include a visual interface for use in conjunction with the input device 18 and output device 20 similar to those screens illustrated in FIGS. 5–6, discussed below. It is also understood that alternative devices may be used to receive commands and data from the user, such as keyboards, mouse devices, and graphical user interfaces (GUI) such as WINDOWS™ 3.1 available form MICROSOFT Corporation, Redmond, Wash., and other operating systems and GUIs, such as OS/2 and OS/2 WARP, available from IBM CORPORATION, Boca Raton, Fla. Processing unit 12 may also include microphones and/or telephone handsets for receiving audio voice data and commands, speech or voice recognition devices, dual tone multi-frequency (DTMF) based devices, and/or software known in the art to accept voice data and commands and to operate the first processing unit 12.

Figures 5, 6:
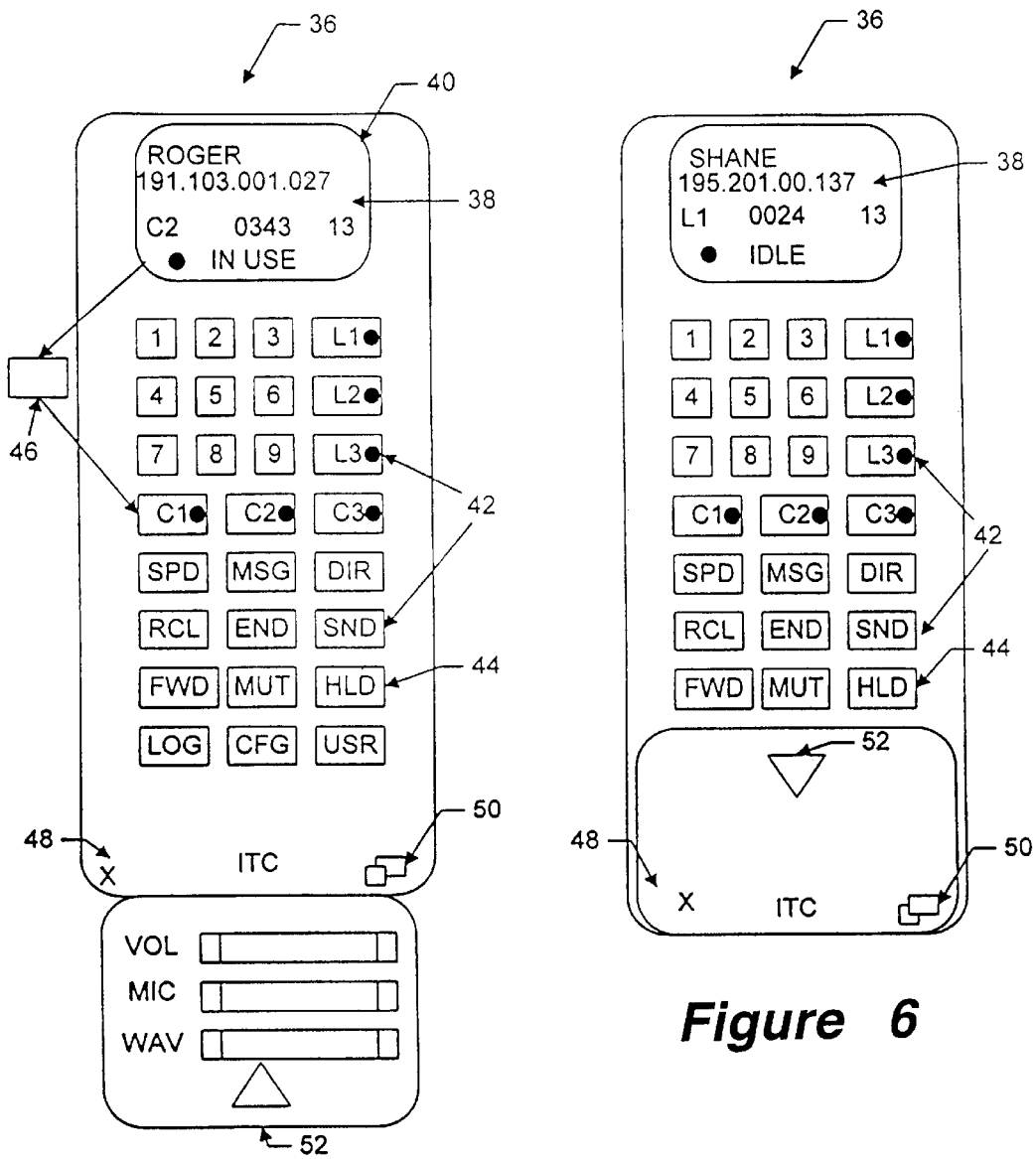
FIG. 5 illustrates a display screen for a processing unit.
FIG. 6 illustrates another display screen for a processing unit.

In addition, either of, the first processing unit 12 and the second processing unit 22 may be implemented in a personal digital assistant (PDA) providing modem and E-mail capabilities and Internet access, with the PDA providing the input/output screens for mouse interactions or for touch-screen activation as shown, for example, in FIGS. 5–6, as a combination of the input device 18 and output device 20.

For clarity of explanation, the illustrative embodiment of the disclosed point-to-point Internet protocol and system 10 is presented as having individual functional blocks, which may include functional blocks labeled as "processor" and "processing unit". The functions represented by these blocks may be provided through the use of either shared or dedicated hardware, including, but not limited to, hardware capable of executing software. For example, the functions of each of the processors and processing units presented herein may be provided by a shared processor or by a plurality of individual processors. Moreover, the use of the functional blocks with accompanying labels herein is not to be construed to refer exclusively to hardware capable of executing soft are. Illustrative embodiments may include digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided. Any and all of these embodiments may be deemed to fall within the meaning of the labels for the functional blocks as used herein.

The processing units 12, 22 are capable of placing calls and connecting to other processing units connected to the Internet 24, for example, via dialup SLIP/PPP lines. In an exemplary embodiment, each processing unit assigns an unsigned long session number, for example, a 32-bit long sequence in a *.ini file for each call. Each call may be assigned a successive session number in sequence, which may be used by the respective processing unit to associate the call with one of the SLIP/PPP lines, to associate a <ConnectOK> response signal with a <Connect Request> signal, and to allow for multiplexing and demultiplexing of inbound and outbound conversations on conference lines, as explained hereinafter.

For callee (or called) processing units with fixed IP addresses, the caller (or calling) processing unit may open a "socket", i.e. a file handle or address indicating where data is to be sent, and transmit a <Call> command to establish communication with the callee utilizing, for example, datagram services such as Internet Standard network layering as well as transport layering, which may include a Transport Control Protocol (TCP) or a User Datagram Protocol (UDP) on top of the IP. Typically, a processing unit having a fixed IP address may maintain at least one open socket and a called processing unit waits for a <Call> command to assign the open socket to the incoming signal. If all lines are in use, the callee processing unit sends a BUSY signal or message to the caller processing unit. As shown in FIG. 1, the disclosed point-to-point Internet protocol and system 10 operate when a callee processing unit does not have a fixed or predetermined IP address. In the exemplary embodiment and without loss of generality, the first processing unit 12 is the caller processing unit and the second processing unit 22 is the callee processing unit. When either of processing units 12, 22 logs on to the Internet via a dial-up connection, the respective unit is provided a dynamically allocated IP address by an Internet service provider.

Upon the first user initiating the point-to-point Internet protocol when the first user is logged on to the Internet 24, the first processing unit 12 automatically transmits its associated E-mail address and its dynamically allocated IP address to the connection server 26. The connection server 26 then stores these addresses in the database 34 and time stamps the stored addresses using timer 32. The first user operating the first processing unit 12 is thus established in the database 34 as an active on-line party available for communication using the disclosed point-to-point Internet protocol. Similarly, a second user operating the second processing unit 22, upon connection to the Internet 24 through an Internet service provider, is processed by the connection server 26 to be established in the database 34 as an active on-line party.

The connection server 26 may use the time stamps to update the status of each processing unit; for example, after 2 hours, so that the on-line status information stored in the database 34 is relatively current. Other predetermined time periods, such as a default value of 24 hours, may be configured by a systems operator.

The first user with the first processing unit 12 initiates a call using, for example, a Send command and/or a command to speeddial an $N^{TH}$ stored number, which may be labeled [SND] and [SPD] [N], respectively, by the input device 18 and/or the output device 20, such as shown in FIGS. 5–6. In response to either the Send or speeddial commands, the first processing unit 12 retrieves from memory 16 a stored E-mail address of the callee corresponding to the $N^{TH}$ stored number. Alternatively, the first user may directly enter the E-mail address of the callee.

The first processing unit 12 then sends a query, including the E-mail address of the callee, to the connection server 26. The connection server 26 then searches the database 34 to determine whether the callee is logged-in by finding any stored information corresponding to the callee's E-mail address indicating that the callee is active and on-line. If the callee is active and on-line, the connection server 26 then performs the primary point-to-point Internet protocol; i.e. the IP address of the callee is retrieved from the database 34 and sent to the first processing unit 12. The first processing unit 12 may then directly establish the point-to-point Internet communications with the callee using the IP address of the callee.

If the callee is not oh-line when the connection server 26 determines the callee's status, the connection server 26 sends an OFF-LINE signal or message to the first processing unit 12. The first processing unit 12 may also display a message such as "Called Party Off-Line" to the first user.

When a user logs off or goes off-line from the Internet 24, the connection server 26 updates the status of the user in the database 34; for example, by removing the user's information, or by flagging the user as being off-line. The connection server 26 may be instructed to update the user's information in the database 34 by an off-line message, such as a data packet, sent automatically from the processing unit of the user prior to being disconnected from the connection server 26. Accordingly, an off-line user is effectively disabled from making and/or receiving point-to-point Internet communications.

Figure 2:
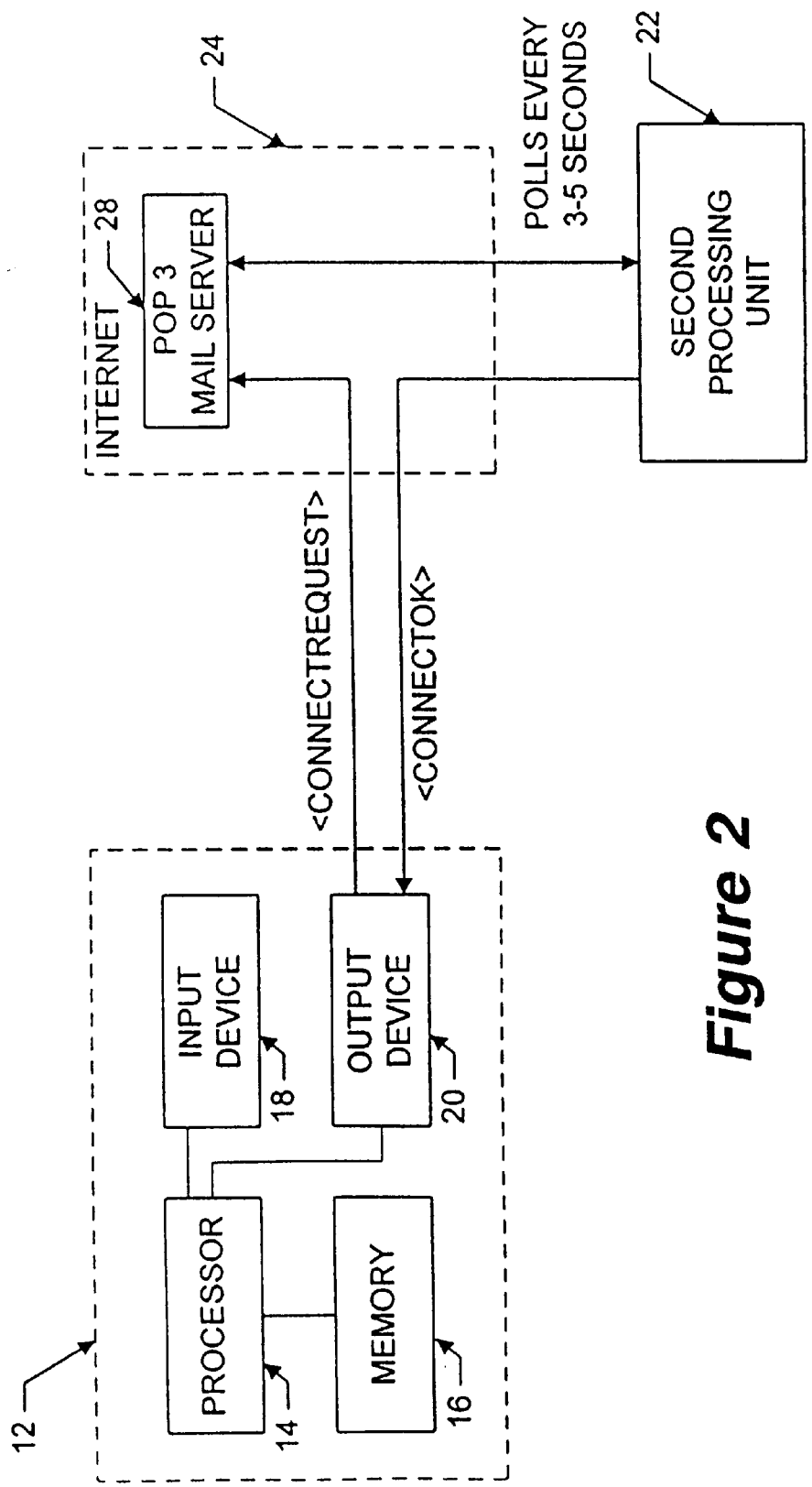
FIG. 2 illustrates, in block diagram format, the system using a secondary point-to-point Internet protocol.
Figure 3:
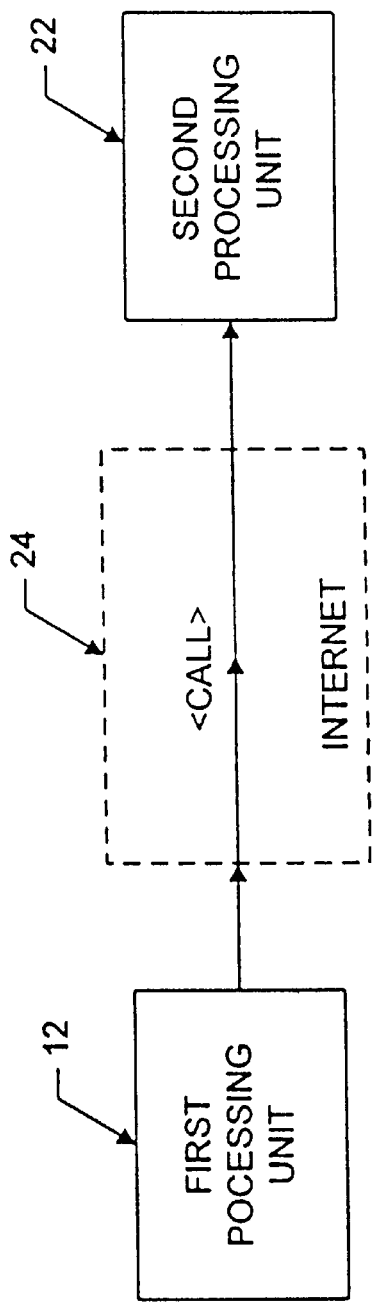
FIG. 3 illustrates, in block diagram format, the system of FIGS. 1–2 with the point-to-point Internet protocol established.
Figure 4:
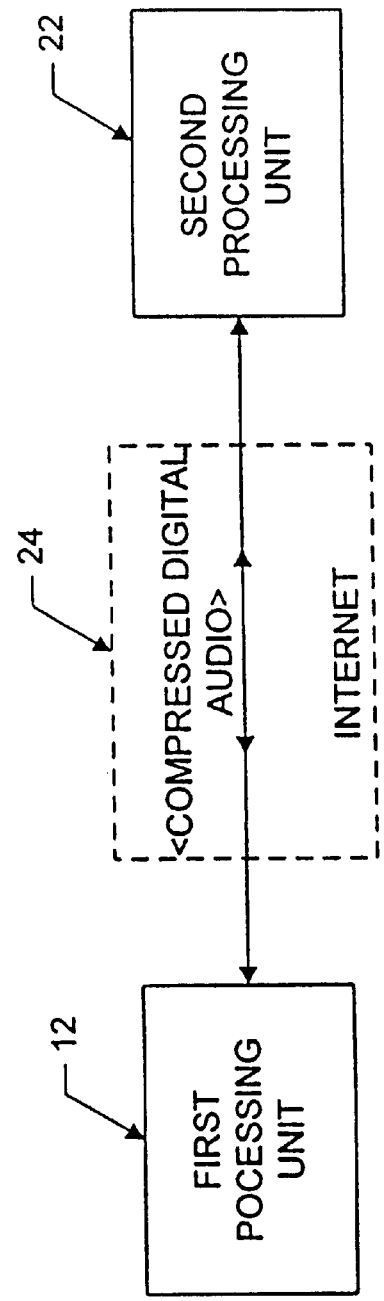
FIG. 4 is another block diagram of the system of FIGS. 1–2 with audio communications being conducted.

As shown in FIGS. 2–4, the disclosed secondary point-to-point Internet protocol may be used as an alternative to the primary point-to-point Internet protocol described above, for example, if the connection server 26 is non-responsive, unreachable, inoperative, and/or unable to perform the primary point-to-point Internet protocol, as a non-responsive condition. Alternatively, the disclosed secondary point-to-point Internet protocol may be used independent of the primary point-to-point Internet protocol. In the disclosed secondary point-to-point Internet protocol, the first processing unit 12 sends a <ConnectReq> message via E-mail over the Internet 24 to the mail server 28. The E-mail including the <ConnectReq> message may have, for example, the subject

[*wp#XXXXXXXX#nnn.nnn.nnn.#emailAddr]

where nnn.nnn.nnn.nnn. is the current (i.e. temporary or permanent) IP address of the first user, and XXXXXXXX is a session number, which may be unique and associated with the request of the first user to initiate point-to-point communication with the second user.

The following E-mail messages are transmitted to a remote users post office protocol server via simple mail transport protocol using MIME by the event manager, as explained hereinafter.

<ConnectRequest>

<CampRequest>

<VoiceMail>

<FileTransfer>

<E-mail>

The following E-mail messages are received from a local WebPhone users POP server via the POP protocol using MIME by the event manager, as explained hereinafter.

<Connect Request>

<Camp Request>

<Voice Mail>

<File Transfer>

<E-mail>

<Registration>

As described above, the first processing unit 12 may send the <ConnectReq> message in response to an unsuccessful attempt to perform the primary point-to-point Internet protocol. Alternatively, the first processing unit 12 may send the <ConnectReq> message in response to the first user initiating a SEND command or the like.

After the <ConnectRequest> message via E-mail is sent, the first processing unit 12 opens a socket and waits to detect a response from the second processing unit 22. A timeout timer, such as timer 32, may be set by the first processing unit 12, in a manner known in the art, to wait for a predetermined duration to receive a <ConnectOK> signal. The processor 14 of the first processing unit 12 may cause the output device 20 to output a Ring signal to the user, such as an audible ringing sound, about every 3 seconds. For example, the processor 14 may output a *.wav file, which may be labeled RING.WAV, which is processed by the output device 20 to output an audible ringing sound.

Second processing unit 22 polls mail server 28 at an interval, for example, once a minute, to check for incoming E-mail. Generally, second processing unit 22 checks the messages stored on mail server 28 at regular intervals to wait for and detect incoming E-mail indicating a <CONNECT REQ> message from first processing unit 12.

Typically, for sending E-mail to user's having associated processing units operatively connected to a host computer or server operating an Internet gateway, E-mail for a specific user may be sent over Internet 24 and directed to the permanent IP address of the mail server providing the target user's mail services. The E-mail is transported by a standard protocol, for example, SMTP, and stored into memory (not shown in FIG. 1) associated with mail server 28.

The E-mail may subsequently be retrieved by processing unit 22 on behalf of the user with another standard protocol, for example POP 3. The actual IP address utilized by the user's processing unit is immaterial to the retrieval of E-mail, as the mail server 28 can, for example, be polled or queried from any point on the network.

Upon receiving the incoming E-mail signal from the first processing unit 12, the second processing unit 22 may assign or may be assigned a temporary IP address. Therefore, the delivery of the E-mail through the Internet 24 provides the second processing unit 22 with a session number as well as IP addresses of both the first processing unit 12 and the second processing unit 22.

Point-to-point communication may then be established by the processing unit 22 processing the E-mail signal to extract the <ConnectRequest> message, including the IP address of the first processing unit 12 and the session number. The second processing unit 22 may then open a socket and generate a <ConnectOK> response signal, which includes the temporary IP address of the second processing unit 22 as well as the session number of the first processing unit.

The second processing unit 22 sends the <ConnectOK> signal directly over the Internet 24 to the IP address of the first processing unit 12 without processing by the mail server 28, and a timeout timer of the second processing unit 22 may be set to wait and detect a <Call> signal expected from the first processing unit 12.

Real-time point-to-point communication of audio signals over the Internet 24, as well as video and voicemail, may thus be established and supported without requiring permanent IP addresses to be assigned to either of the users or processing units 12, 22. For the duration of the realtime point-to-point link, the relative permanence of the current IP addresses of the processing units 12, 22 is sufficient, whether the current IP addresses were permanent (i.e. predetermined or preassigned) or temporary (i.e. assigned upon initiation of the point-to-point communication).

In the exemplary embodiment, a first user operating the first processing unit 12 is not required to be notified by the first processing unit 12 that an E-mail is being generated and sent to establish the point-to-point link with the second user at the second processing unit 22. Similarly, the second user is not required to be notified by the second processing unit 22 that an E-mail has been received and/or a temporary IP address is associated with the second processing unit 22. The processing units 12, 22 may perform the disclosed point-to-point Internet protocol automatically upon initiation of the point-to-point communication command by the first user without displaying the E-mail interactions to either user. Accordingly, the disclosed point-to-point Internet protocol may be transparent to the users. Alternatively, either of the first and second users may receive, for example, a brief message of "CONNECTION IN PROGRESS" or the like on a display of the respective output device of the processing units 12, 22.

After the initiation of either the primary or the secondary point-to-point Internet protocols described above in conjunction with FIGS. 1–2, the point-to-point communication link over the Internet 24 may be established as shown in FIGS. 3–4 in a manner known in the art. For example, referring to FIG. 3, upon receiving the <ConnectOK> signal from the second processing unit 22, the first processing unit 12 extracts the IP address of the second processing unit 22 and the session number, and the session number sent from the second processing unit 22 is then checked with the session number originally sent from the first processing unit 12 in the <ConnectReq> message as E-mail. If the session numbers sent and received by the processing unit 12 match, then the first processing unit 12 sends a <Call> signal directly over the Internet 24 to the second processing unit 22; i.e. using the IP address of the second processing unit 22 provided to the first processing unit 12 in the <ConnectOK> signal.

Upon receiving the <Call> signal, the second processing unit 22 may then begin a ring sequence, for example, by indicating or annunciating to the second user that an incoming call is being received. For example, the word "CALL" may be displayed on the output device of the second processing unit 22. The second user may then activate the second processing unit 22 to receive the incoming call.

Referring to FIG. 4, after the second processing unit 22 receives the incoming call, realtime audio and/or video conversations may be conducted in a manner known in the art between the first and second users through the Internet 24, for example, by compressed digital audio signals. Each of the processing units 12, 22 also display to each respective user the words "IN USE" to indicate that the point-to-point communication link is established and audio or video signals are being transmitted.

In addition, either user may terminate the point-to-point communication link by, for example, activating a termination command, such as by activating an [END] button or icon on a respective processing unit, causing the respective processing unit to send an <End> signal which causes both processing units to terminate the respective sockets, as well as to perform other cleanup commands and functions known in the art.

FIGS. 5–6 illustrate examples of display screens 36 which may be output by a respective output device of each processing unit 12, 22 of FIGS. 1–4 for providing the disclosed point-to-point Internet protocol and system 10. Such display screens may be displayed on a display of a personal computer (PC) or a PDA in a manner known in the art.

As shown in FIG. 5, a first display screen 36 includes a status area 38 for indicating, for example, a called user by name and/or by IP address or telephone number; a current function such as C2; a current time; a current operating status such as "IN USE", and other control icons such as a down arrow icon 40 for scrolling down a list of parties on a current conference line. The operating status may include such annunciators as "IN USE, " "IDLE," "BUSY," "NO ANSWER," "OFFLINE," "CALL," "DIALING," "MESSAGES," and "SPEEDDIAL."

Other areas of the display screen 36 may include activation areas or icons for actuating commands or entering data. For example, the display screen 36 may include a set of icons 42 arranged in columns and rows including digits 0–9 and commands such as END, SND, HLD, etc. For example, the END and SND commands may be initiated as described above, and the HLD icon 44 may be actuated to place a current line on hold. Such icons may also be configured to substantially simulate a telephone handset or a cellular telephone interface to facilitate ease of use, as well as to simulate function keys of a keyboard. For example, icons labeled L1–L4 may be mapped to function keys F1–F4 on standard PC keyboards, and icons C1–C3 may be mapped to perform as combinations of function keys, such as CTRL-F1, CTRL-F2, and CTRL-F3, respectively. In addition, the icons labeled L1–L4 and C1–C3 may include circular regions which may simulate lamps or light emitting diodes (LEDs) which indicate that the function or element represented by the respective icon is active or being performed.

Icons L1–L4 may represent each of 4 lines available to the caller, and icons C1–C3 may represent conference calls using at least one line to connect, for example, two or more parties in a conference call. The icons L1–L4 and C1–C3 may indicate the activity of each respective line or conference line. For example, as illustrated in FIG. 5, icons L1–L2 may have lightly shaded or colored circles, such as a green circle, indicating that each of lines 1 and 2 are in use, while icons L3–L4 may have darkly shaded or color circles, such as a red or black circle, indicating that each of lines 3 and 4 are not in use. Similarly, the lightly shaded circle of the icon labeled C2 indicates that the function corresponding to C2 is active, as additionally indicated in the status are 38, while darkly shaded circles of icons labeled C1 and C3 indicate that such corresponding functions are not active.

The icons 42 are used in conjunction with the status area 38. For example, using a mouse for input, a line that is in use, as indicated by the lightly colored circle of the icon, may be activated to indicate a party's name by clicking a right mouse button for 5 seconds until another mouse click is actuated or the [ESC] key or icon is actuated. Thus, the user may switch between multiple calls in progress on respective lines.

Using the icons as well as an input device such as a mouse, a user may enter the name or alias or IP address, if known, of a party to be called by either manually entering the name, by using the speeddial feature, or by double clicking on an entry in a directory stored in the memory, such as the memory 16 of the first processing unit 12, where the directory entries may be scrolled using the status area 38 and the down arrow icon 40.

Once a called party is listed in the status area 38 as being active on a line, the user may transfer the called party to another line or a conference line by clicking and dragging the status area 38, which is represented by a reduced icon 46. Dragging the reduced icon 46 to any one of line icons L1–L4 transfers the called party in use to the selected line, and dragging the reduced icon 46 to any one of conference line icons C1–C3 adds the called party to the selected conference call.

Other features may be supported, such as icons 48–52, where icon 48 corresponds to, for example, an ALT-X command to exit the communication facility of a processing unit, and icon 50 corresponds to, for example, an ALT-M command to minimize or maximize the display screen 36 by the output device of the processing unit. Icon 52 corresponds to an OPEN command, which may, for example, correspond to pressing the O key on a keyboard, to expand or contract the display screen 36 to represent the opening and closing of a cellular telephone. An "opened" configuration is shown in FIG. 5, and a "closed" configuration is shown in FIG. 6. In the "opened" configuration, additional features such as output volume (VOL) controls, input microphone (MIC) controls, waveform (WAV) sound controls, etc.

The use of display screens such as those shown in FIGS. 5–6 provided flexibility in implementing various features available to the user. It is to be understood that additional features such as those known in the art may be supported by the processing units 12, 22.

Alternatively, it is to be understood that one skilled in the art may implement the processing units 12, 22 to have the features of the display screens in FIGS. 5–6 in hardware; i.e. a wired telephone or wireless cellular telephone may include various keys, LEDs, liquid crystal displays (LCDs), and touchscreen actuators corresponding to the icons and features shown in FIGS. 5–6. In addition, a PC may have the keys of a keyboard and mouse mapped to the icons and features shown in FIGS. 5–6.

Figure 7:
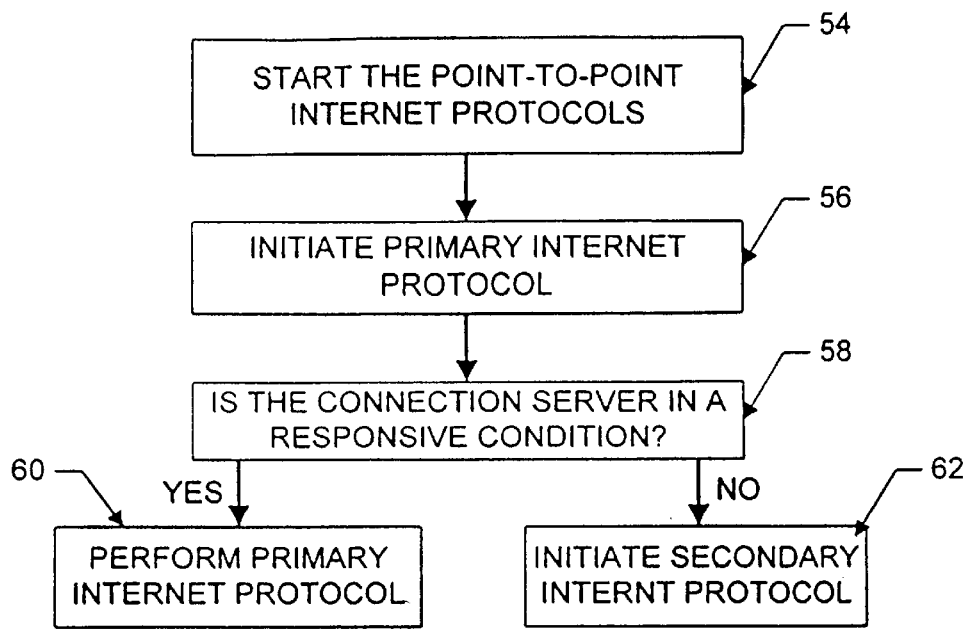
FIG. 7 illustrates a flowchart of the initiation of the point-to-point Internet protocols.

Referring to FIG. 7, the disclosed point-to-point Internet protocol and system 10 is illustrated. First processing unit 12 initiates the point-to-point Internet protocol in step 56 by sending a query from the first processing unit 12 to the connection server 26. If connection server 26 is operative to perform the point-to-point Internet protocol, in step 58, first processing unit 12 receives an on-line status signal from the connection server 26, such signal may include the IP address of the callee or a "Callee Off-Line" message. Next, first processing unit 12 performs the primary point-to-point Internet protocol in step 60, which may include receiving, at the first processing unit 12, the IP address of the callee if the callee is active and on-line. Alternatively, processing unit 60 may initiate and perform the secondary point-to-point Internet protocol in step 62, if connection server 26 is not operable.

Figure 8:
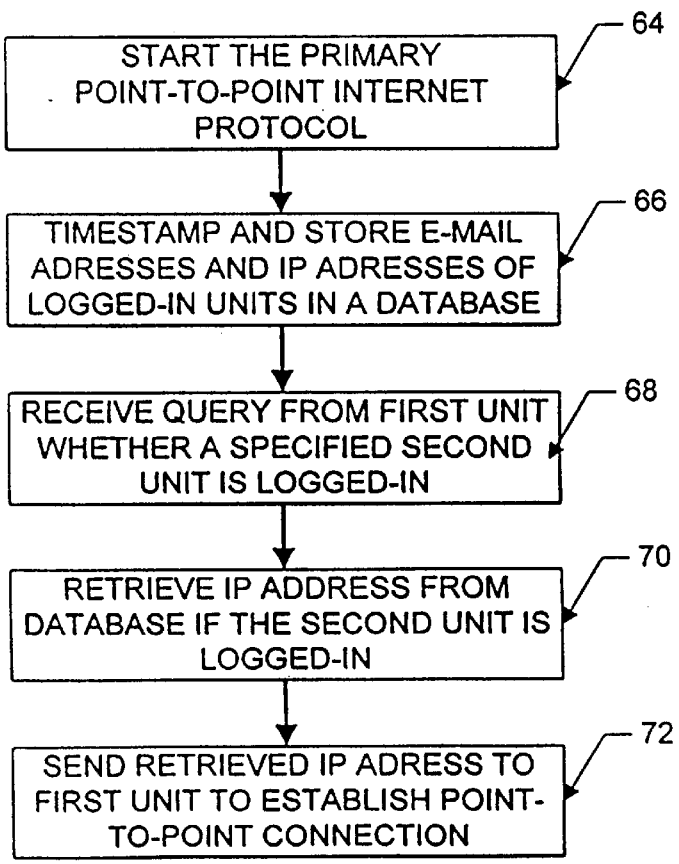
FIG. 8 illustrates a flowchart of the performance of the primary point-to-point Internet protocols.

Referring to FIG. 8, in conjunction with FIGS. 1 and 3–4, the disclosed point-to-point Internet protocol and system 10 are illustrated. Connection server 26 starts the primary point-to-point Internet protocol, in step 64, and timestamps and stores E-mail and IP addresses of logged-in users and processing units in the database 34 in step 66. Connection server 26 receives a query from a first processing unit 12 in step 68 to determine whether a second user or second processing unit 22 is logged-in to the Internet 24, with the second user being specified, for example, by an E-mail address. Connection server 26 retrieves the IP address of the specified user from the database 34 in step 70, if the specified user is logged-in to the Internet, and sends the retrieved IP address to the first processing unit 12 in step 72 to enable first processing unit 12 to establish point-to-point communications with the specified second user.

Figure 9:
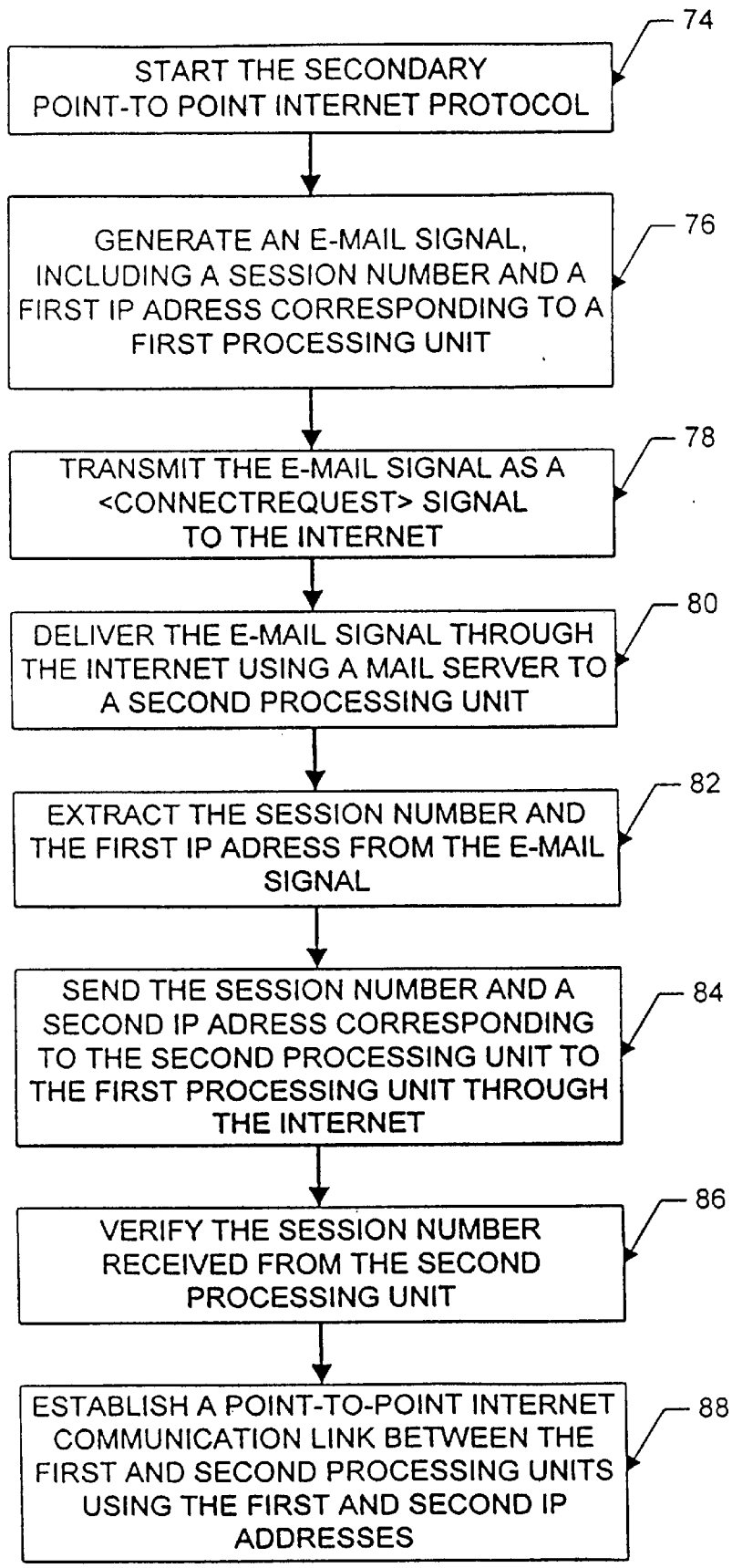
FIG. 9 illustrates a flowchart of the performance of the secondary point-to-point Internet protocol.

The disclosed secondary point-to-point Internet protocol operates as shown in FIG. 9. First processing unit 12 generates an E-mail signal, including a session number and a first IP address corresponding to a first processing unit in step 76. First processing unit 12 transmits the E-mail signal as a <ConnectRequest> signal to the Internet 24 in step 78. The E-mail signal is delivered through the Internet 24 using a mail server 28 to the second processing unit 22 in step 80. Second processing unit 22 extracts the session number and the first IP address from the E-mail signal in step 82 and transmits or sends the session number and a second IP address corresponding to the second processing unit 22, back to the first processing unit 12 through the Internet 24, in step 84. First processing unit 12 verifies the session number received from the second processing unit 22 in step 86, and establishes a point-to-point Internet communication link between the first processing unit 12 and second processing unit 22 using the first and second IP addresses in step 88.

The primary and secondary point-to-point Internet protocols previously described enable users to establish real-time direct communication links over the Internet or other computer networks without the need for any interaction with connection server 26, the connection server providing only directory and information related services.

Figure 10:
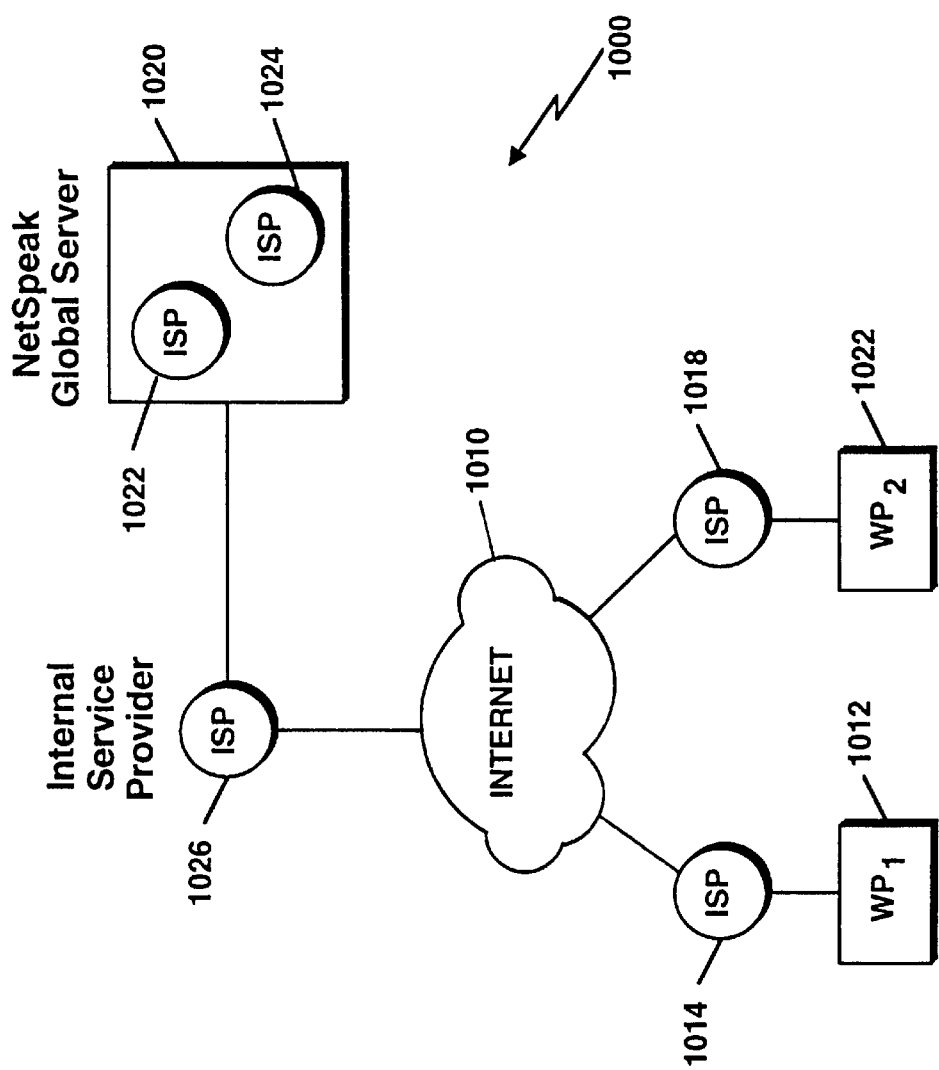
FIG. 10 illustrates schematically a computer network over which the present invention may be utilized.

FIG. 10 illustrates an exemplary computer network 1000 over which the invention may operate. A first processing unit 1012 is coupled to a computer network, illustrated here as the Internet 1010, through an Internet service provider 1014 Similarly, a second processing unit 1022 is coupled to Internet 1010 through Internet service provider 1018. The inventive directory server 1020 is similarly coupled to Internet 1010 through Internet service provider 1026. Directory server 1020 further comprises a connection server 1022 and information server 1024, as will be explained hereinafter. The first processing unit 1012, second processing unit 1022 and directory server 1020 are operatively coupled to each other via the Internet 1010. It will be obvious to those reasonably skilled in the art that network 1000 is not restricted to implementation over the Internet 1010 but may comprise other network configurations such as a local area network (LAN), a wide area network (WAN), a global area network or any number of private networks currently referred to as an Intranet. Such networks may be implemented with any number of hardware and software components, transmission media and network protocols.

Exemplary Computer Architecture

Figure 11:
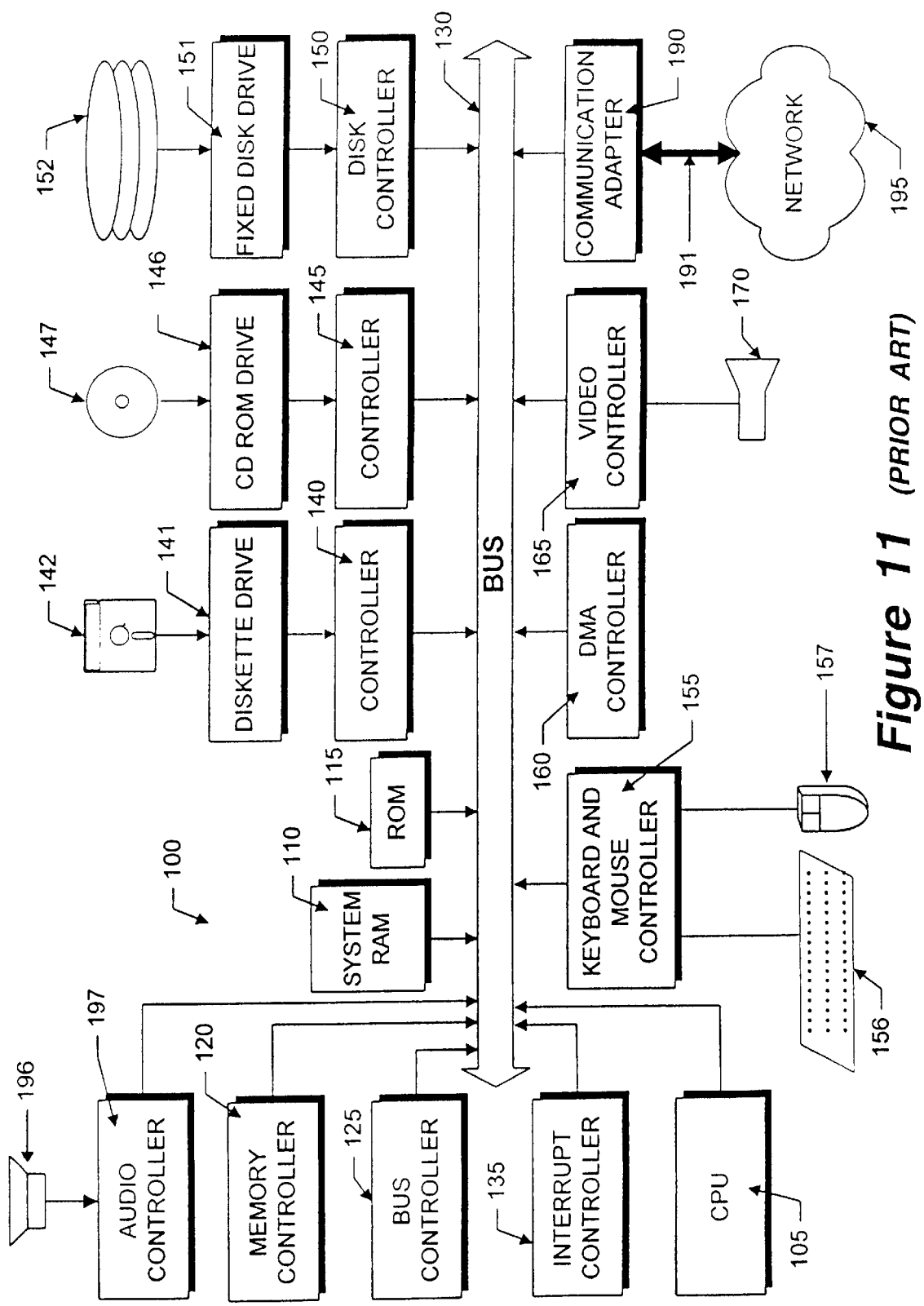
FIG. 11 is a block diagram of a computer system suitable for use with the present invention.

FIG. 11 illustrates the system architecture for a computer system 1100 such as an IBM PS/2®, suitable for implementing first and second processing units 1012 and 1022, respectively, of FIG. 10, as well as global server 1020. The exemplary computer system of FIG. 11 is for descriptive purposes only. Although the description may refer to terms commonly used in describing particular computer systems, such as in IBM PS/2 computer, the description and concepts equally apply to other computer systems ranging from personal digital assistants (PDAs) to workstations to mainframe systems.

Computer system 1100 includes a central processing unit (CPU) 1105, which may be implemented with a conventional microprocessor. System 1100 further includes a random access memory (RAM) 1110 for temporary storage of information, and a read only memory (ROM) 1115 for permanent storage of information. A memory controller 1120 is provided for controlling RAM 1110. A bus 1130 interconnects the components of computer system 1100. A bus controller 1125 is provided for controlling bus 1130. An interrupt controller 1135 is used for receiving and processing various interrupt signals from the system components.

Mass storage may be provided by diskette 1142, CD ROM 1147, or hard drive 1152. Data and software may be exchanged with computer system 1100 via removable media such as diskette 1142 and CD ROM 1147. Diskette 1142 is insertable into diskette drive 1141 which is, in turn, connected to bus 1130 by a controller 1140. Similarly, ° CD ROM 1147 is insertable into CD ROM drive 1146 which is, in turn, connected to bus 1130 by controller 1145. Hard disk 1152 is part of a fixed disk drive 1151 which is connected to bus 1130 by controller 1150.

User input to computer system 100 may be provided by a number of devices. For example, a keyboard 1156 and mouse 1157 are connected to bus 1130 by controller 1155. An audio transducer 1196, which may act as both a microphone and a speaker, is connected to bus 1130 by audio controller 1197, as illustrated. It will be obvious to those reasonably skilled in the art that other input devices, such as a pen and/or tablet may be connected to bus 1130 with an appropriate controller and software, as required. DMA controller 1160 is provided for performing direct memory access to RAM 1110. A visual display is generated by video controller 1165 which controls video display 1170. Computer system 1100 also includes a communications adaptor 1190 which allows the system to be interconnected to a network such as a local area network (LAN), a wide area network (WAN), or the Internet, schematically illustrated by transmission medium 1191 and network 1195.

In the illustrative embodiment, computer system 1100 may include an Intel microprocessor such as the 80486DX-33 MHz, or faster, a 14.4Kb communication modem or faster, and a sound card, as further described with reference to FIG. 12.

Operation of computer system 1100 is generally controlled and coordinated by operating system software, such as the OS/2® operating system, available from International Business Machines Corporation, Boca Raton, Fla., or Windows® DOS-based operating system available from Microsoft Corp., Redmond, Wash. The operating system controls allocation of system resources and performs tasks such as process scheduling, memory management, networking, and I/O services, among other things.

Figure 12:
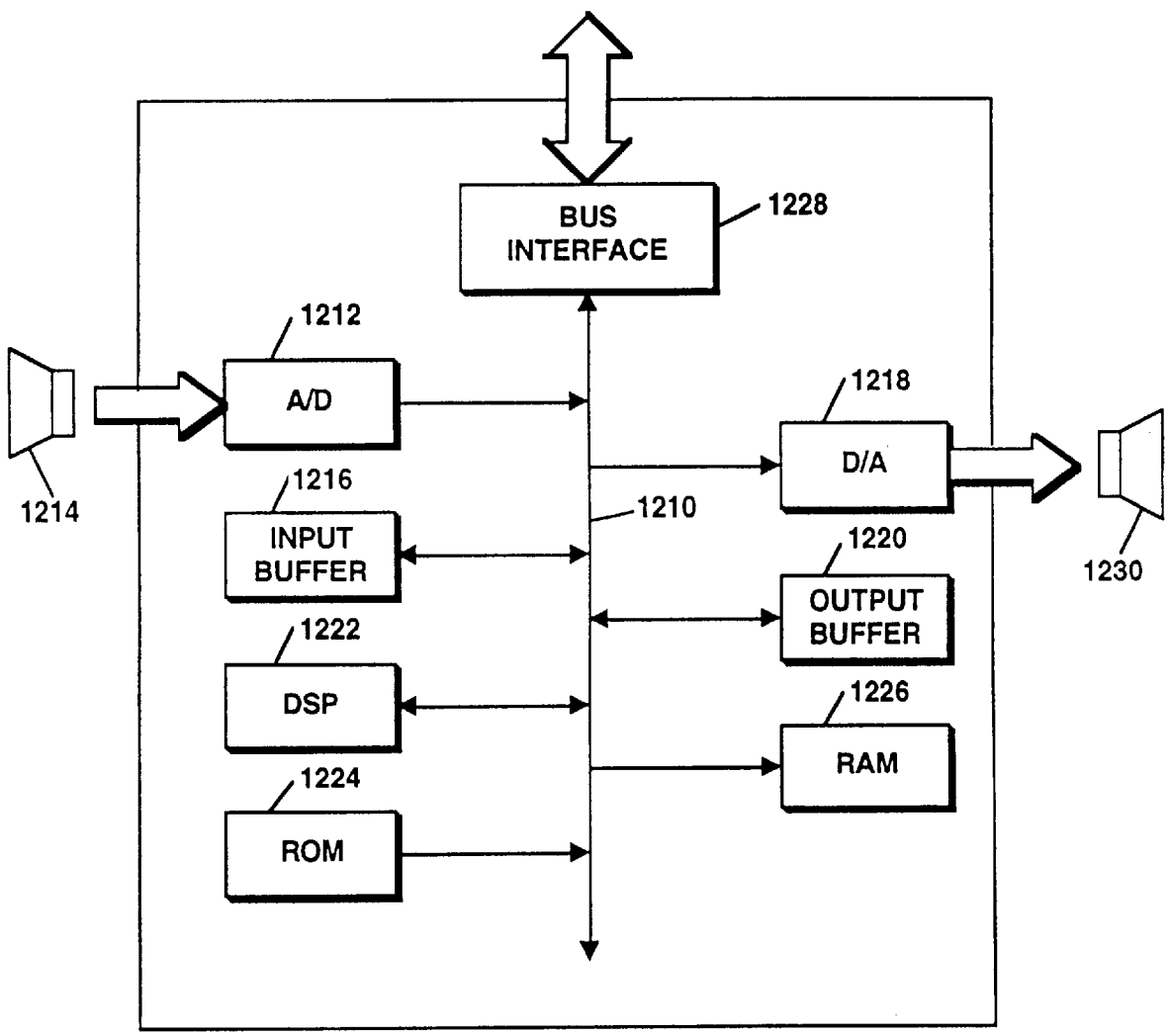
FIG. 12 is a block diagram of an audio processing card suitable for use with the computer system of FIG. 10.

FIG. 12 illustrates schematically an audio sound card 1200 which may be used to implement audio controller 1197 of FIG. 11. Specifically, sound card 1200 may comprise, in the exemplary embodiment, an analog-to-digital (A/D) converter 1212, an input buffer 1216, a digital signal processor (DSP) 1222, ROM 1224, RAM 1226, an output buffer 1220, and an analog-to-digital (D/A) converter 1218, all of which may be interconnected over a bus 1210. Bus 1210 is in turn coupled to a bus interface 1228 which, in turn, is coupled to bus controller 1125 of computer system 1100 of FIG. 11.

As illustrated in FIG. 12, A/D converter 1212 is coupled to audio transducer 1214 which is typically a microphone. Conversely, D/A converter 1218 is coupled to audio transducer 1230, typically a speaker. It will be obvious to those reasonably skilled in the art that audio transducers 1214 and 1230, may be combined into a single element which serves as both a transmitter and receiver of audio signal.

In operation, A/D converter 1212 samples the audio signals supplied to it by transducer 1214 and stores the digital samples in buffer 1216. The digital sampling occurs under control of a program typically stored in ROM 1224, or, alternatively, under the control of digital signal processor 1222. The digital samples stored in input buffer 1216 are forwarded periodically, typically when the buffer reaches near capacity, over bus 1210 to bus 1130 of FIG. 11, for further processing by computer system 1100. The device driver for audio sound card 1200 generates system interrupts which will cause the digital samples stored in input buffer 1216 to be retrieved for processing. In the exemplary embodiment, the digital samples are uncompressed as supplied to computer system 1100. However, compression of the digital samples may occur using DSP 1222 executing an appropriate compression algorithm, if desired.

Digital audio samples from computer system 1100 are also be converted to analog signals by sound card 1200. The digital samples are supplied to bus 1210 and temporarily stored into output buffer 1220. The digital samples are then converted by D/A converter 1218 into an analog signals which are then supplied to audio transducer 1230, i.e., a speaker, or to further amplification and processing devices.

Sound card 1200 contemplated for use with the present invention may be implemented with any number of Windows compliant sound cards, such as the Sound Blaster sound card, commercially available from Creative Technologies Ltd., Singapore. Such Window compliant sound cards have a Windows compliant software interface allowing a standardized mechanism for software programs to operate the sound card device, such as Winsoc 1.1.

WebPhone Application

In the exemplary embodiment of the present invention, each of first processing unit 1012 and second processing unit 1022 of FIG. 10 are executing a software application capable of enabling point-to-point communication over network 1000, such as an Internet telephone application. One such application suitable for use with the present invention is the WebPhone Version 1.0 or higher, software, hereafter referred as the "WebPhone," commercially available from NetSpeak Corporation, Boca Raton, Fla. A description of the architecture and operation of the WebPhone is provided herein with reference to FIGS. 5–6, 13A–B and 14. An extensive detailed description of the architecture, application program interface, graphic user interface, and operation of the Web-Phone can be found in copending U.S. patent application Ser. No. 08/719,554 entitled "Point-to-Point Computer Network Communication Utility Utilizing Dynamically Assigned Internet Protocol Addresses" by Mattaway et al. filed on an even date herewith and commonly assigned, the complete subject matter of which is incorporated herein by reference.

Figure 13:
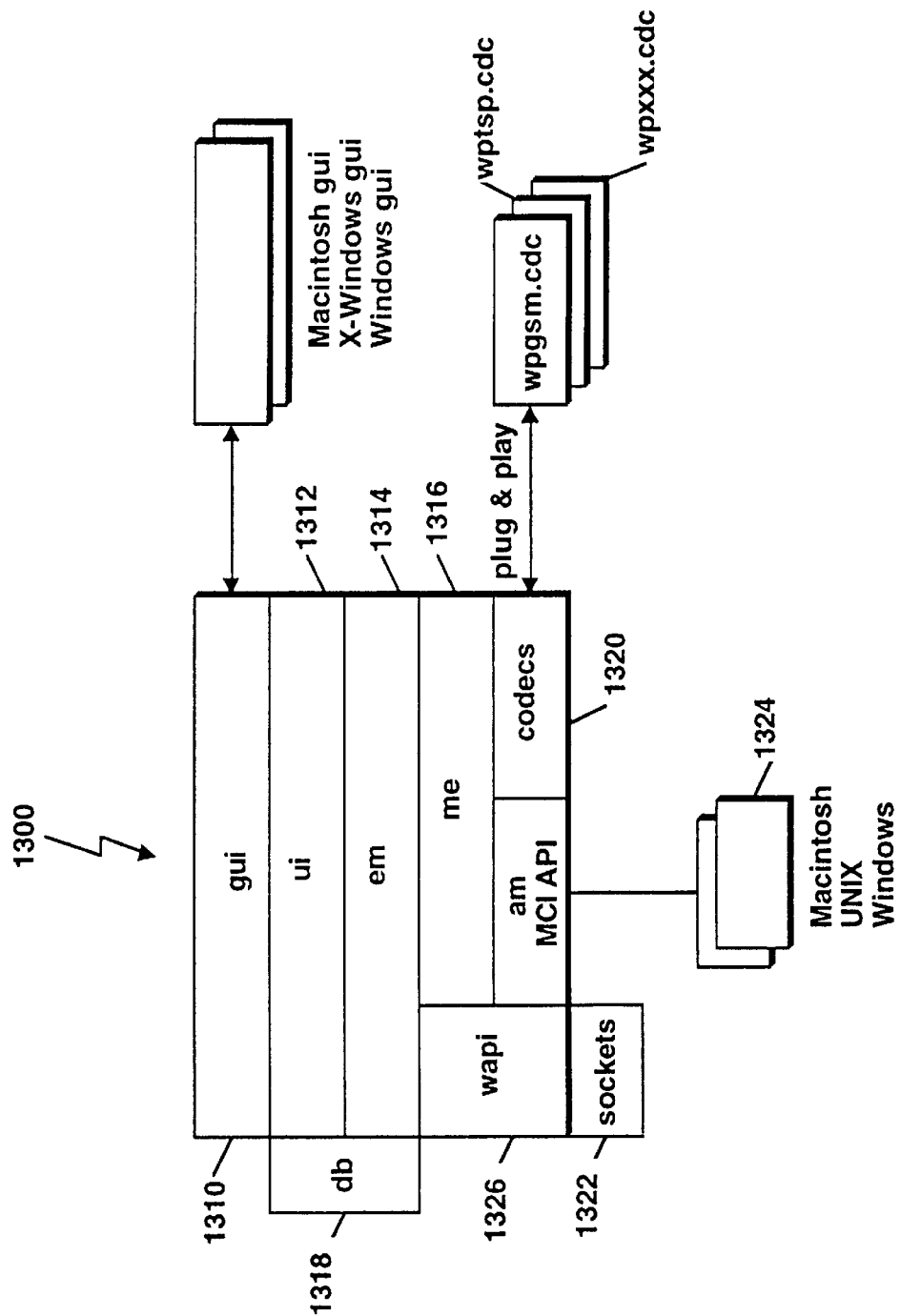
FIGS. 13A–B are schematic block diagrams of the elements comprising the inventive computer network telephony mechanism of the present invention.
Figure 13:
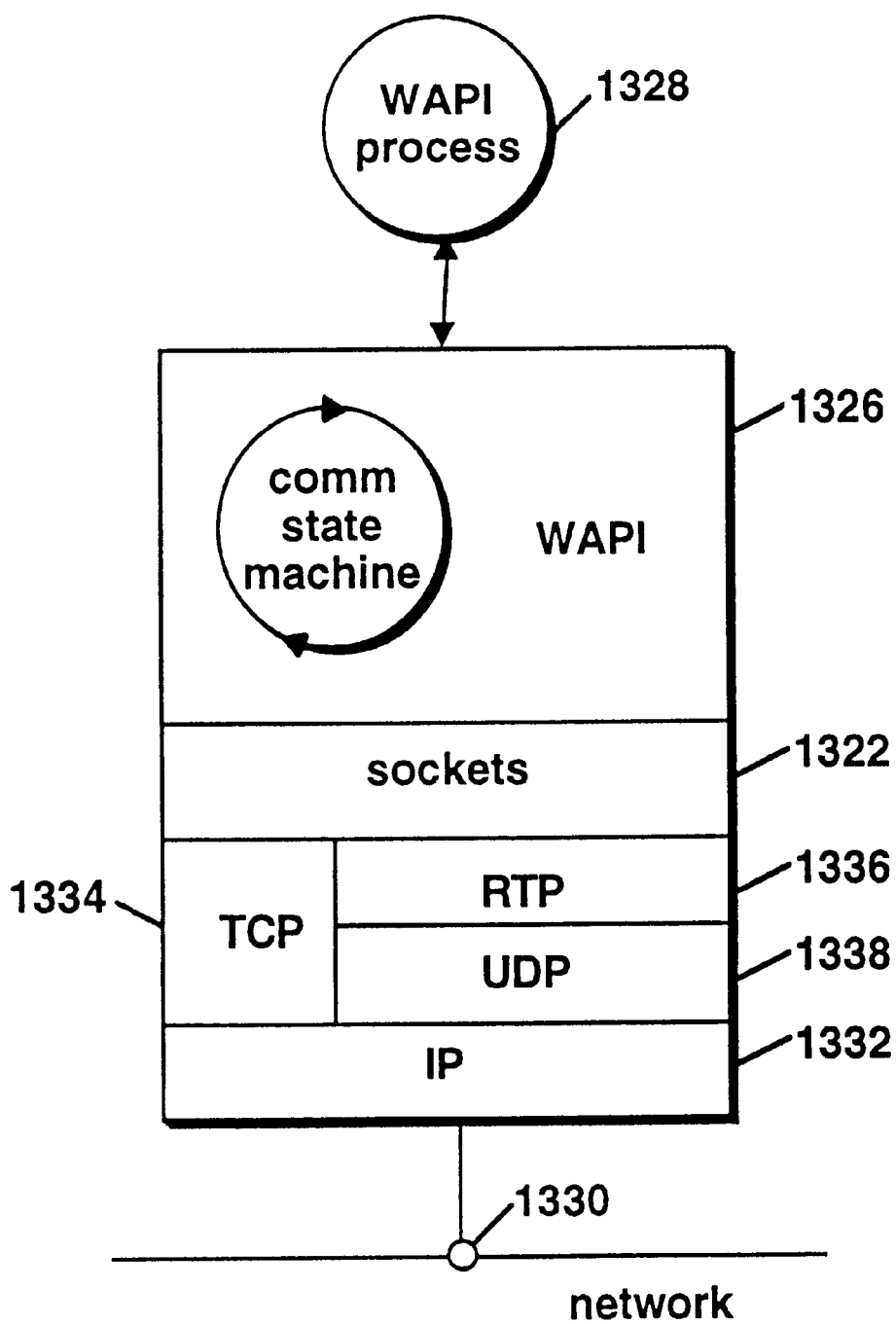

Referring to FIGS. 13A–B, schematic block diagrams of the WebPhone architecture are illustrated. The WebPhone is an end-user software application which enables users to send real-time audio data to other WebPhone users over the Internet or any public or private TCP/IP based computer networks. The WebPhone application and architecture may be designed to run on any number of operating systems or computer architectures. In the illustrative embodiment, the WebPhone application is implemented as a Windows compatible application executable on an IBM PC architecture or a clone thereof.

Referring to FIG. 13A, the WebPhone 1300 comprises a set of object modules, written in a programming language such as C++, which work together in a concerted fashion to provide real-time, multitasking, network-based media transmission and reception. WebPhone 1390 comprises a graphic user interface (GUI) 1310, a user interface (UI) 1312, an event manager 1314, a media engine 1316, a database dynamic link library 1318, one or more audio compression/decompression (codecs) 1320, an audio manager 1324, a WebPhone application program interface (API) 1326, and a network interface 1322.

WebPhone GUI 1310 comprises the visual objects seen on a computer display by the user, as illustrated by the screen capture of FIG. 14 discussed hereinafter. WebPhone GUI 1310 serves only to display the artwork associated with the underlying objects of WebPhone UI 1312. WebPhone GUI 1310 may be implemented in a modular fashion distinct from the WebPhone UI for rapid portability. In this manner, other graphic user interface environments such as those compatible with the Macintosh, X-Windows or OS/2 operating systems, may be substituted via the Plug and Play protocol, as would be understood by those reasonably skilled in the arts.

The WebPhone UI 1312 objects maintain the state of the WebPhone GUI and provide feedback to the WebPhone GUI objects from events originating from either the user or the event manager 1314. When WebPhone changes a state that requires user notification, WebPhone UI objects notify associated WebPhone GUI objects to display the appropriate art work to the user. WebPhone UI objects also interface with the database dynamic link library 1318 to maintain the WebPhone database information, e.g. configuration information, phone directory information, etc.

The WebPhone event manager 1314 processes all the events originating from the user, via WebPhone UI 1312, the media engine 1316, and WebPhone API 1326. Event manager 1314 may be implemented as a table-driven state machine that processes the above-identified events and performs the functions necessary to bring the WebPhone from one state to another. For example, event manager 1314 interacts with media engine 1316 to create, control and remove concurrently executing jobs managed by media engine 1316. Event manager 1314 also interfaces with the WebPhone API 1326 to provide communications with other WebPhones and connection servers, as described in more detail hereinafter. WebPhone database 1318 is a dynamic link library of tree-based subroutines that provide fast database access to the WebPhone configuration information, personal phone directory, etc.

WebPhone media engine 1316 manages the allocation of associated resources to provide a multitasking environment and controls the flow of real-time data streams, e.g., conversations, outgoing messages, etc., and non-real-time data streams, e.g., voice mail, graphic images, files, etc., to and from a user network connection. The objects representing tasks are created by event manager 1314, thereby freeing media engine 1316 to manage resource routing. Specifically, the media engine routes data streams from sources such as a microphone, file or network socket, to destinations such as speaker, destination file or other network socket. To perform such routing functions the media engine interfaces with the WebPhone API 1326 to control communication with other processes, and further communicates with audio manager 1324 to communicate with the system input/output apparatus, such as sound card 1200 of FIG. 12. Media engine 1314 may be designed to employ heuristic methods to sense and efficiently utilize available bandwidth to achieve timely and accurate delivery of all data streams, both real-time and non-real-time.

Media engine 1316, further interacts with WebPhone codec 1320 to achieve compression and decompression of audio data streams. Codec 1320 provides coding of digital samples from the sound card 1200 of FIG. 12 into a compressed format more suitable for transmission over a computer network. Codec 1320 further provides decoding of a compressed signal prior to its submission to sound card 1200 for subsequent conversion to an audible analog signal. In the exemplary embodiment, WebPhone codec 1320 is implemented in a modular fashion so that codecs may be replaced and updated with newer, more efficient compression/decompression algorithms via the Plug and Play protocol. A codec suitable for use with the present invention is the True Speech codec, version 8.5, commercially available from the DSP Group, Inc., Santa Clara, Calif. The True Speech codec is an enhanced linear predicative coding algorithm, specifically designed to efficiently encode and decode human speech data. The True Speech codec samples the digital sample stream from sound card 1200, and, using a look-up table-based algorithm, tries to predict the value of the next data sample in the digital data stream based on the history of prior data sample values. The compressed data stream comprises a combination of identifiers of the predicted sample values, as well as error values used to correct the predictive values. Accordingly, the a mount of digital data actually transmitted to represent the audio signal is significantly reduced in comparison to transmission of the actual data samples generated by sound card 1200. The True Speech codec provides temporal, frequency domain compression of the digital data representing the audio signal.

Audio manager 1324 handles communication with the audio sound card 1200 and presents a common interface to media engine 1314. Audio manager 1324 interfaces with sound card 1200 through one or more application program interfaces. In the illustrative embodiment, audio manager 1324 utilizes low-level Microsoft Windows wave input/output routines to interface with MCI compliant sound cards. As with codecs 1320, audio manager 1324 may be implemented to adhere to the Plug and Play protocol so other compliant audio sound cards or circuits, such as those for the Apple Macintosh, commercially available from Apple Computer Company, Cupertino, Calif., or a Unix compatible sound card or circuit may interact with the audio manager 1324.

The WebPhone API 1326 enables the WebPhone to communicate with other WebPhones, connection and directory assistance servers, Internet gateway servers, credit processing servers, database access servers and other client processes implementing the WebPhone API. As illustrated in FIG. 13B, the WebPhone API utilizes sockets, i.e., a file handle or address indicating where data is to be sent, allowing WebPhone API enabled processes to reside on the same computer, on a local area network, on a wide area network, or over the Internet. A process 1328 communicates with the WebPhone API 1326 through a plurality of sockets 1322. The sockets 1322 are accessible by network 1330 through a number of protocols including Internet Protocol (IP) 1332, Transmission Control Protocol (TCP) 1334, Real-Time Protocol (RTP) 1336 and User Datagram Protocol (UDP) 1338. The WebPhone API provides remote command control of WebPhones and servers via the TCP. WebPhone API 1326 transfers real-time and streamed audio via the UDP protocol and real-time audio and video data via the UDP and RTP protocols. The WebPhone API utilizes TCP to transfer data of different types, i.e., file, image, graphics, etc. as well as to transfer streamline video and other multimedia data types, such as Java developed by Sun MicroSystems, Mountain View, Calif. In addition, the WebPhone API provides user definable commands and data types.

Figure 14:
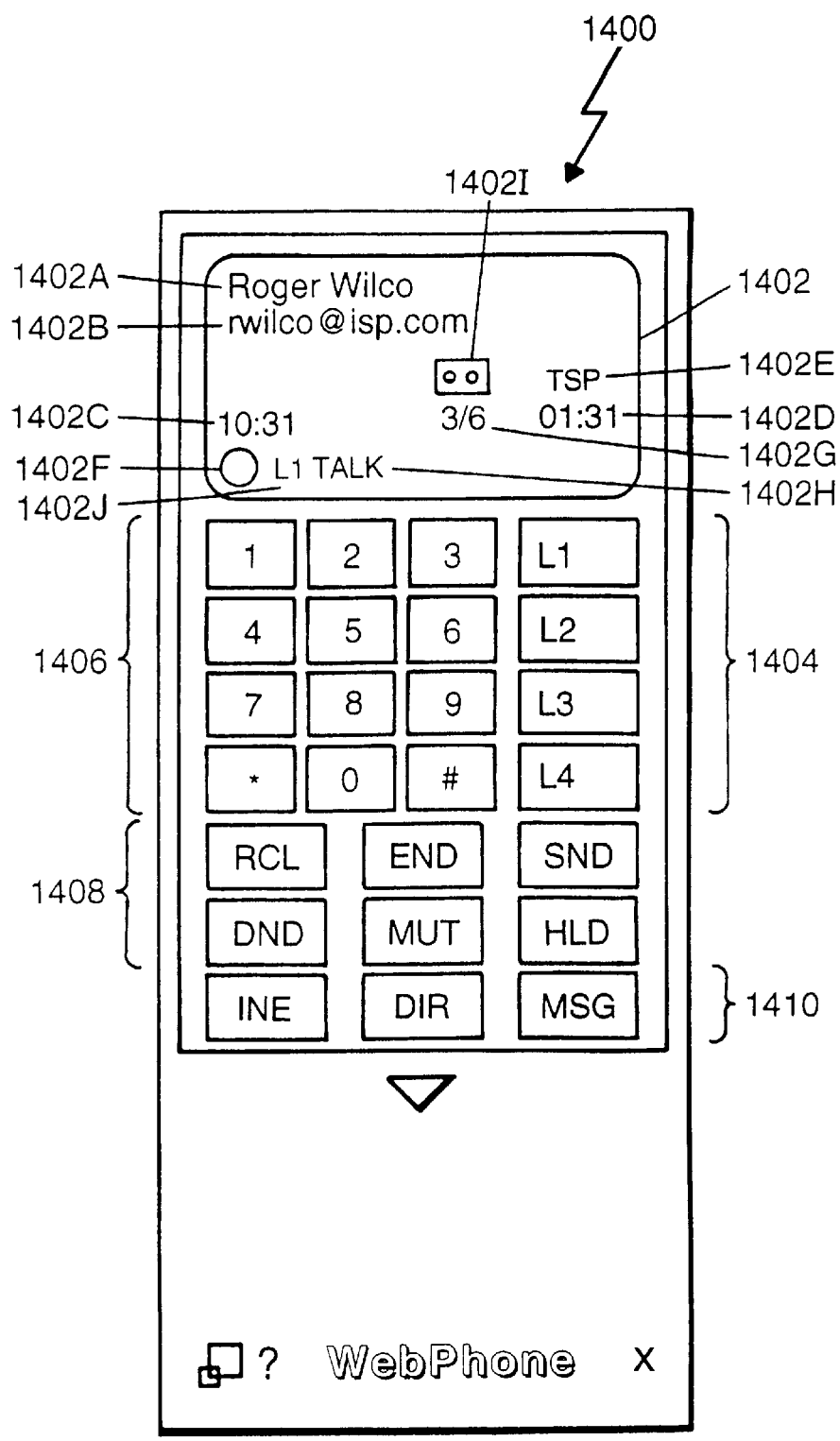
FIG. 14 is a screen capture illustrating an exemplary user interface of the present invention.

FIG. 14 illustrates the graphic display produced upon invoking the WebPhone application. Display 1400 is an alternative embodiment to that illustrated in FIGS. 5–6 with similar graphic elements, icons and display areas functioning as previously described with reference to FIGS. 5–6.

WebPhone Global Server

Having described the architecture of the WebPhone software which enables the first and second processing units to establish point-to-point communication over a network, a discussion of the global connection/information server is appropriate.

Figure 15A:
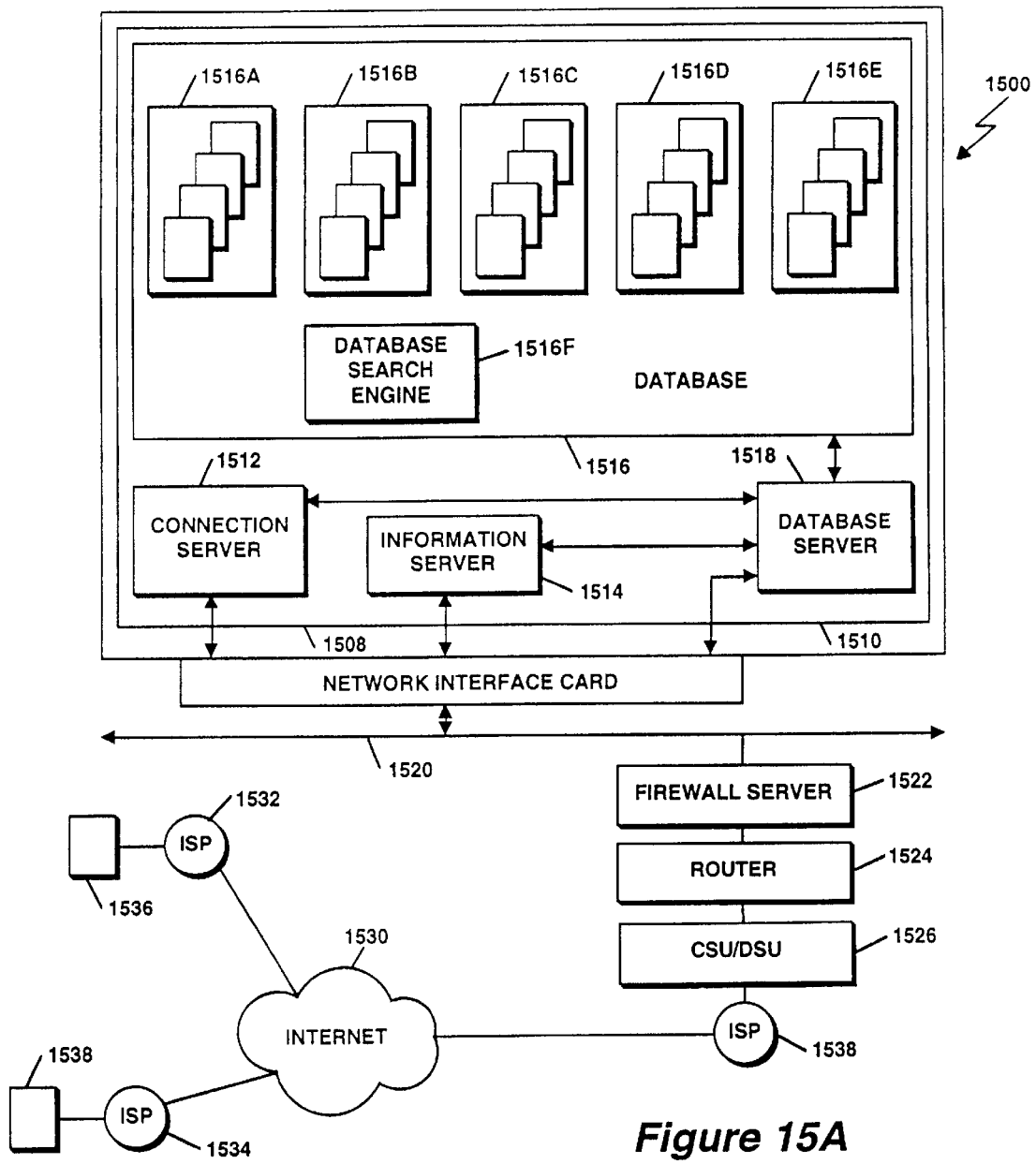
FIG. 15 is a schematic diagram illustrating the architecture of the connection server apparatus suitable for use with the present invention.

Referring to FIG. 15A, a network diagram, similar to that shown in FIG. 10, is illustrated, including a schematic diagram of the global server 1500 and the various devices operatively coupling server 1500 to the Internet 1530. A first processing unit executing the WebPhone application, hereafter referred to as WebPhone 1536, is coupled to Internet 1530 through an Internet service provider 1532. Similarly, a second processing unit executing the WebPhone application, referred to as WebPhone 1538, is coupled to the Internet 1530 by an Internet service provider 1534. Global server 1500 is coupled to Internet 1530 by an Internet service provider 1528, a CSU/DSU 1526, a router 1524, and a fire wall server 1522. In the illustrative embodiment, fire wall server 1522 and global server 1500 are connected through a local area network 1520. Network 1520 may be implemented with an Ethernet or other suitable transport for TCP/IP communications. However, as will be obvious to those recently skilled in the arts, server 1500 may be connected directly to fire wall server 1522.

In the illustrative embodiment, firewall server 1522 is a single firewall mechanism which protects unauthorized access from network 1530 into global server 1500. Firewall server 1522 may be implemented on a work station, such as a SPARC 5 or SPARC 20 server from Sun MicroSystems, executing a commercially available firewall software application such as Raptor, available from Raptor Systems. Essentially, the firewall server prevents unauthorized access into global server 1500 and thereby prevents destruction of any of the information contained therein by checking the source of requests for information to global server 1500.

Router 1524 translates logical addresses among networked topologies and may be implemented with any number of commercial router devices such as the CISCO model 2501 router executing CISCO 11.0 software, both commercially available from CISCO Systems, Inc., San Jose, Calif.

CSU/DSU 1526 (Channel Send Unit/Data Send Unit) functions as a sophisticated modem, converting network data to high speed serial data for transfer over a T1 or T3 line. Such high speed data is connected to another CSU/DSU, typically at the telephone company over the T1 or T3 line. An apparatus suitable for use in implementing CSU/DSU 1526 in the present invention is the AT&T Paradigm by AT&T Laboratories, Murray Hill, N.J.

FIG. 15A further illustrates a logical schematic of global server 1500. The server comprises a hardware platform 1508 on which an operating system 1510 executes. In the illustrative embodiment, hardware platform 1508 may comprise any number of commercially available high end work stations such as a DEC Alpha 4100 System, commercially available from Digital Equipment Corporation, Maynard, Mass., or a SPARC 5 or a SPARC 20, both commercially available from Sun Micro Systems, Mountain View, Calif. Operating system 1510, in the illustrative embodiment, may comprise the Unix, commercially available from Novell, Windows NT, commercially available from Microsoft Corporation, or Solaris, commercially available from Sun MicroSystems, Inc. Executing on operating system 1510 are a number of processes including connection server 1512, information server 1514, database server 1518 and database 1516.

Connection Server

Connection server 1512 provides a directory information service to WebPhone client processes currently on-line with respect to the computer network. Connection server 1512 behaves like a virtual machine within global server 1500 and interacts with database 1516 through database server 1518 and with network interface card 1540 through the WebPhone API. The basic function of connection server 1512 is to provide a one-to-one mapping between an identifier of a WebPhone client process, such as a E-mail address, and the current IP address, dynamic or fixed, associated with that WebPhone client process.

As described in further detail hereinafter, when a WebPhone client transmits a <CONNECT REQ> packet to global server 1500, an E-mail address such as "Shane@netspeak.com" is provided to connection server 1512. Connection server 1512 then compares the E-mail address with the values of the records contained in on-line table 1516B and, if a match occurs with one of the records contained therein, transmits the value of the Internet Protocol address associated with that record to the requesting WebPhone client, i.e., a one-to-one matching between E-mail addresses and Internet Protocol addresses.

Figure 16A:
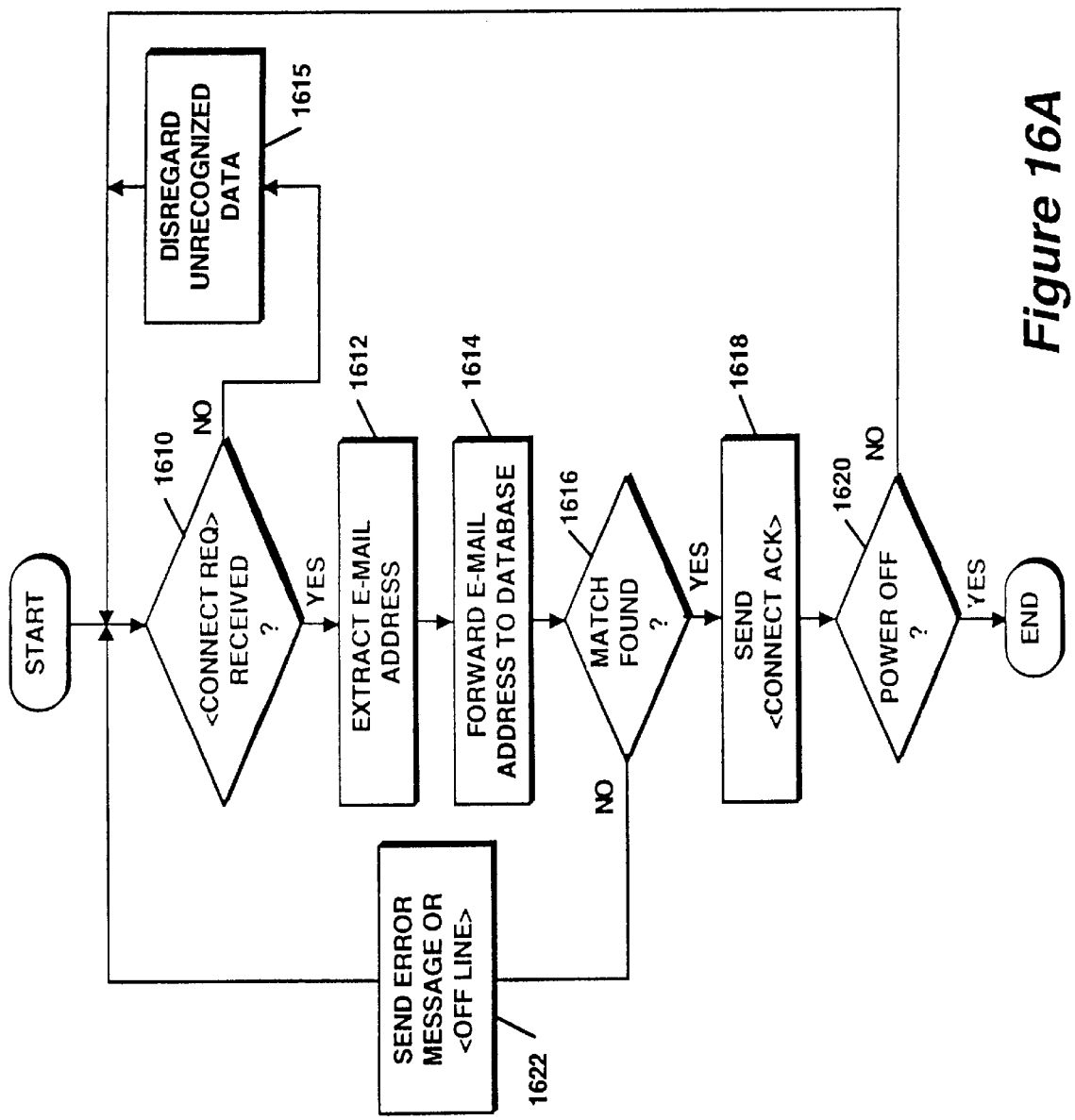
FIG. 16A is a flowchart illustrating the process steps performed by the connection server in accordance with the present invention.

Referring to FIG. 16A, a flow chart illustrating the basic process steps used by connection server 1512 to implement a one-to-one mapping of E-mail addresses to Internet Protocol addresses in accordance with the present invention is illustrated. The coding of the process steps of the flowchart of FIG. 16A into instructions suitable to control global server 1500 will be understandable by those having ordinary skill in the art of programming. Connection server 1512 remains in an idle state until a <CONNECT REQ> packet is transmitted from a WebPhone client to global server 1500, as illustrated by decisional block 1610 of FIG. 16A. Upon receipt of the packet, connection server 1512 extracts the E-mail address from the packet and supplies the E-mail address to database server 1518 which them communicates using the ODBC standard with database 1516 to perform a search of On-line Table 1516B, as illustrated by process blocks 1612 and 1614. Database 1516 performs a search of on-line Table 1516B and supplies the current Internet Protocol address of the WebPhone client associated with the E-mail address to connection server 1512, via database server 1518. If a corresponding Internet Protocol address is found for the E-mail address contained in the query, connection server 1512 supplies the Internet protocol address to the requesting WebPhone client by transmitting a <CONNECT ACK> packet, as illustrated by decisional block 1616 and process block 1618. If, however, there is no Internet Protocol address associated with the queried E-mail address or the WebPhone client is off line, connection server 1512 will send an <OFFLINE> packet to the WebPhone client, as illustrated by process block 1622. Connection server 1512 will return to an idle state to await the receipt of another <CONNECT REQ> packet, as illustrated by FIG. 16A. A description of the above described packets as well as a diagram illustrating the packet transfer sequence between a WebPhone client and global server 1500 can be found with reference to Tabes 7–8 and FIG. 17A, respectively.

Information Server

Figure 16B:
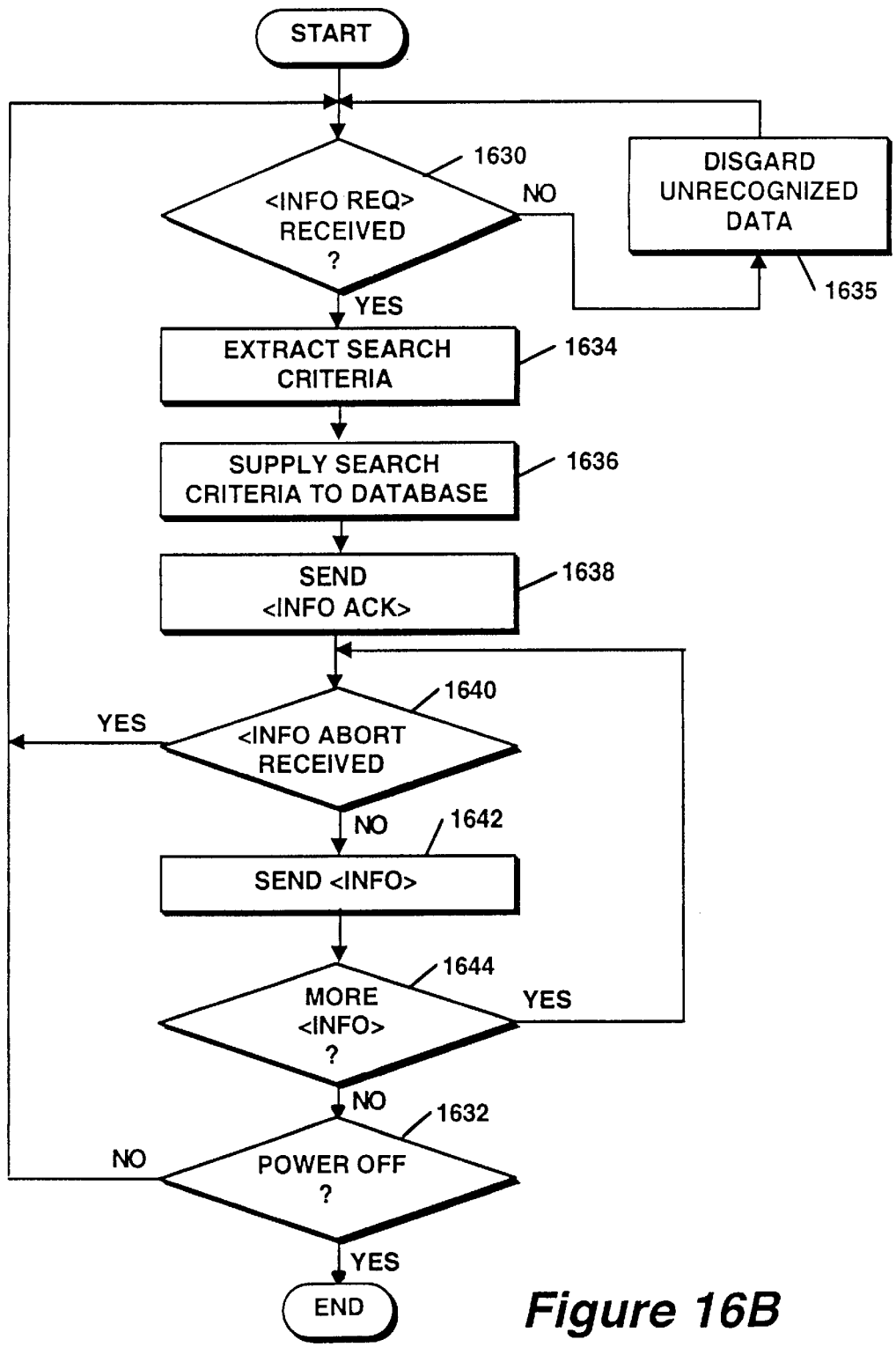
FIG. 16B is a flowchart illustrating the process steps performed in accordance with the information server of the present invention.

Information server 1514 provides an interface between requests from WebPhone client processes and database 1516. Information server 1514 includes code written to extract the search criteria from an <INFO REQ> packet and supply the search criteria to the database search engine of database 1516 using the ODBC standard. In particular, referring to FIG. 16B, a flow chart illustrating the basic process steps used by information server 1514 in performing information/directory service functions in accordance with the present invention is illustrated. The coding of the process steps of the flow chart into instructions suitable for execution by global server 1500 will be understood by those having ordinary skill in the art of programming. Information server 1514 remains idle until an <INFO REQ> packet is received from a WebPhone client process, as illustrated by decisional step 1630. Next, information server 1514 extracts the data elements defined within the <INFO REQ> packet and supplies them to database server 1518 which, in turn, forward them to database 1516, as represented by the process step 1634 and 1636. The search engine contained within database 1516 performs the search and supplies to information server 1514 all client records meeting the search criteria specified in the <INFO REQ> packet, or a message indicating that no records were found. Next, information server 1514 transmits a <INFO ACK> packet to the WebPhone client process indicating the number of records satisfying the search criteria, as indicated by process step 1638. The WebPhone client may wish to receive all records satisfying the search criteria, or, if the number is excessively large, may desire to further refine the search by transmitting a <INFO ABORT> packet to information server 1514 and defining new search parameters to be sent with a subsequent <INFO REQ> packet. If a <INFO ABORT> packet is received by information server 1514, the process will return to an idle state, as illustrated by decisional block 1640. If no <INFO ABORT> packet was received, information server 1514 will transmit one or more <INFO> packets to the requesting WebPhone client until all records have been received by the WebPhone client, as illustrated by process step 1642. Information server 1514 will return to an idle state awaiting another <INFO REQ> packet, as illustrated in FIG. 16B. A description of the packets comprising the WebPhone protocol is illustrated in Tables 7–8 and a diagram illustrating the packet transfer sequence defined in FIG. 17A–B.

Network interface card 1540 interfaces with connection server 1512, information 1514, and database server 1518 using the WebPhone API definition, as described herein, and the Windows Sockets 1.1 Protocol, or, in a Unix-based operating system, Berkeley Sockets Network API. Network interface card 1514 may comprise, in illustrative embodiment, an Ethernet card capable of transmitting data at rates of 100 Mbps or greater, such cards being commercially available through a number of different vendors.

The connection from CSU/DSU 1526 to ISP 1528 may comprise a T1 connection, i.e., a long-distance, digital, point-to-point communication circuit capable of transmitting a signal at 1.544 Mbps with 24 channels at 64Kbps. Alternatively, a T3 connection may be used, i.e., a connection is similar to a T1 connection except it is capable of transmitting at 44.746 Mbps per second with up to 28 T1 channels. Other connections may be suitable, depending on specific requirements and availability.

Database

Database 1516 of global server 1500 may be implemented with any of a number of commercially available structured query language (SQL) database engines, such as Oracle 7.x, Informix, or Microsoft SQL server 6.x. The SQL database resides on a RAID 1 and RAID 5 mirrored disk array. As will be explained hereinafter, database 1516 interacts with control server 1512 and information server 1514 through database server 1518. In the illustrative embodiment, database 1516 comprises a Client table 1516A, an On-line table 1516B, a WebBoard table 1516C, a WebBoard configuration table 1516D and a WebBoard Source table 1516E.

Client table 1516A comprises a plurality of records, each of which may have the fields and corresponding data elements as described in Table 1. Each WebPhone user, hereinafter "client," has a separate record in table 1516A containing the information defining the client's profile of personal information. In Table 1, the "activated," "paid," and "published" fields are boolean yes/no fields. The "id" field comprises a unique ID sequence identifying a particular WebPhone client. The "activation date," "address change date," and "access date" fields are time references measured in seconds since 00:00 Coordinated Universal Time (UTC), Jan. 1, 1970. The "IPAddr" field represents the Internet protocol address of the WebPhone client and, if unknown, has a default value of 0.0.0.0. The database record containing a WebPhone client's profile, is defined upon first logging-on to global server 1500 and may be updated each time a WebPhone user's profile changes, as explained hereinafter.

The On-line table 1516B provides a dynamic list of those clients from 1516A who are currently On-line, as well as their current Internet protocol address. On-line Table 1516B comprises a plurality of records each of which may have the fields and data types illustrated in Table 2. The record entries of On-line table 1516B are used by connection server 1512 and information server 1514, as explained hereinafter, to provide a directory of those WebPhone client processes currently having on-line status with respect to the computer network.

The WebBoard™ is a virtual multimedia billboard which is transmitted as a series of multimedia data files to WebPhone client processes while the WebPhone application is activated. An extensive description of the WebBoard utility and its operation can be found in copending U.S. patent application Ser. No. 08/719,891 entitled Method and Apparatus for Distribution of Multimedia Data Over a Computer Network by Mattaway et al., commonly assigned, the subject matter of which is incorporated herein by reference.

A number of tables are associated with the WebBoard functionality including WebBoard table 1516C, a WebBoard configuration table 1516D, and a WebBoard source table 1516E. WebBoard table 1516C includes a plurality of records each describing a specific WebBoard and having the field and data types illustrated in Table 3. The "id" field of Table 3 provides a unique identification number for the WebBoard file. The "imageType" field defines the video format of the image such as JPEG, TIF, GIF, etc. The "audio" field defines the nature of the audio file, e.g. a.wav file or a MIDI file, while the "audioType" field defines the codec, if any, used to compress/decompress the audio file. The "hits" field defines the number of times the WebBoard has been selected by WebPhone clients, while the "hits profile" field defines the file name of the file identifying those WebPhone clients generating hits to the subject WebBoard.

The WebBoard configuration table 1516D may have at least one record having the fields and data types illustrated in Table 4. The count field represents the number of WebBoard records currently in the table 1516C.

The WebBoard source table 1516E may comprise a plurality of records each having the fields and data types defined in Table 5. The "URL" field of Table 5 defines a data link in accordance with Uniform Resource Locator protocol to the home page or Web site of the source. In the illustrative embodiment, any entity, including vendors, advertisers, individuals or groups wishing to post information or having a Web site or home page may have a WebBoard displayable through the present invention.

Database Server

Database server 1518 serves as the interface between database 1516 and connection server 1512 and information server 1514. Specifically, connection server 1512 and information server 1514 communicate with database engine 1518 through application program interfaces embedded in the code implementation of both the connection server and the information server. Database server 1518 communicates with database 1516, in the illustrative embodiment, using the open database connectivity (ODBC) standard, developed by Microsoft Corporation, Redmond, Wash. Database server 1518 functions to supply structured database queries to database 1516 and to supply the results therefrom to connection server 1514 and information server 1512. In the illustrative embodiment, database server 1518 may be implemented as a "virtual machine" executing on global server 1500, or, alternatively, may be implemented on a separate computer system such as a DEC Alpha 4100 Workstation executing DEC Unix operating system, both available from Digital Equipment Corporation, Maynard, Mass. Database server 1518 communicates with network interface card 1518 using the WebPhone Application Program Interface described herein.

Global Server Network

Figure 15B:
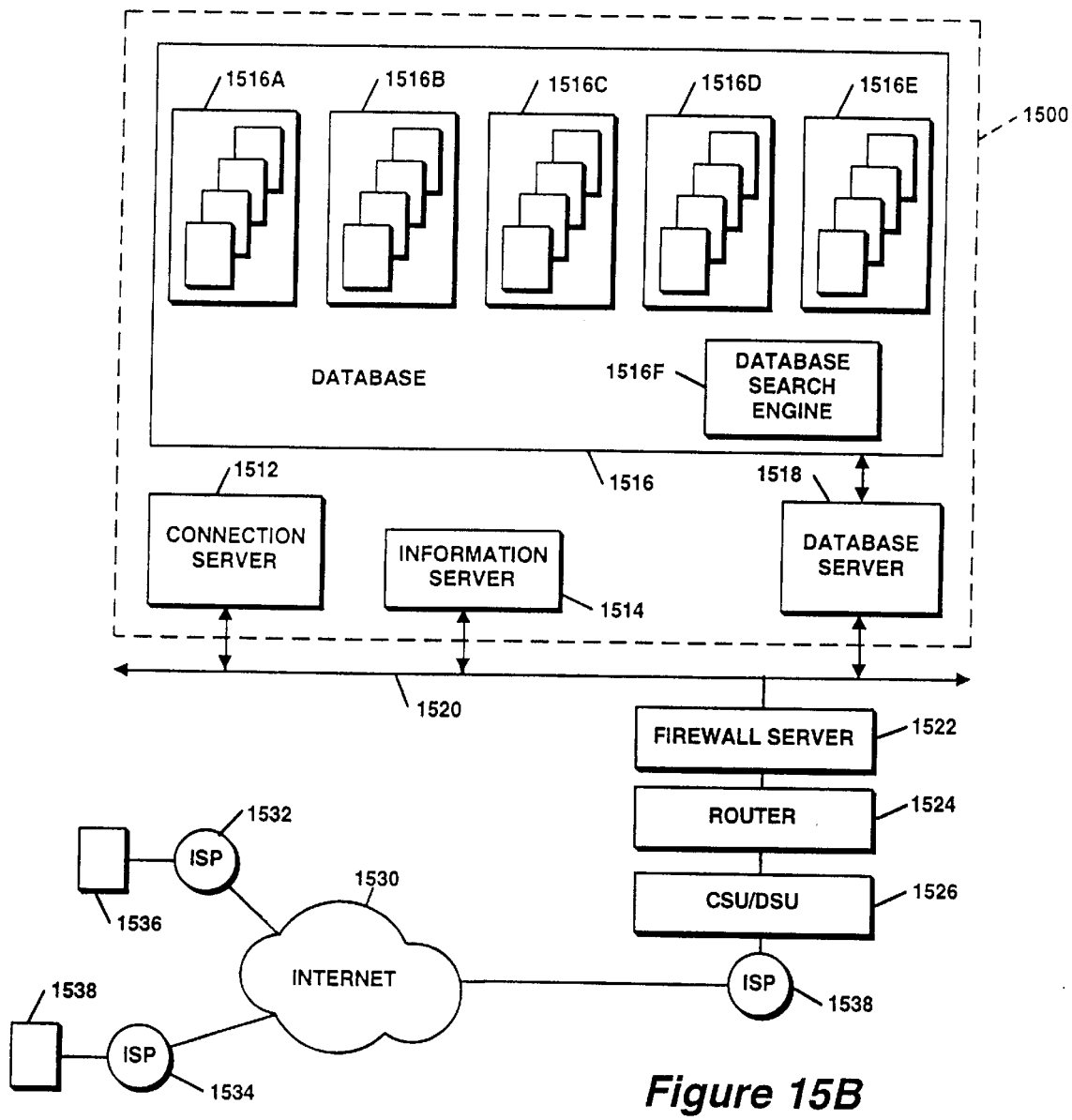

In the illustrative embodiment, global server 1500 is implemented as a single server apparatus on which a plurality of "virtual machines" execute simultaneously. However, it will be obvious to those reasonably skilled in the art that a plurality of separate servers, one dedicated to each of connection server 1512, information server 1514, and database server 1518 may be interconnected to database 1516 and to each other using a local area network, to form a composite "virtual" global server, as illustrated by FIG. 15B, the construction of the system illustrated in FIG. 15B being within the knowledge of those reasonably skilled in the art in light of the descriptions contained herein.

Figure 15C:
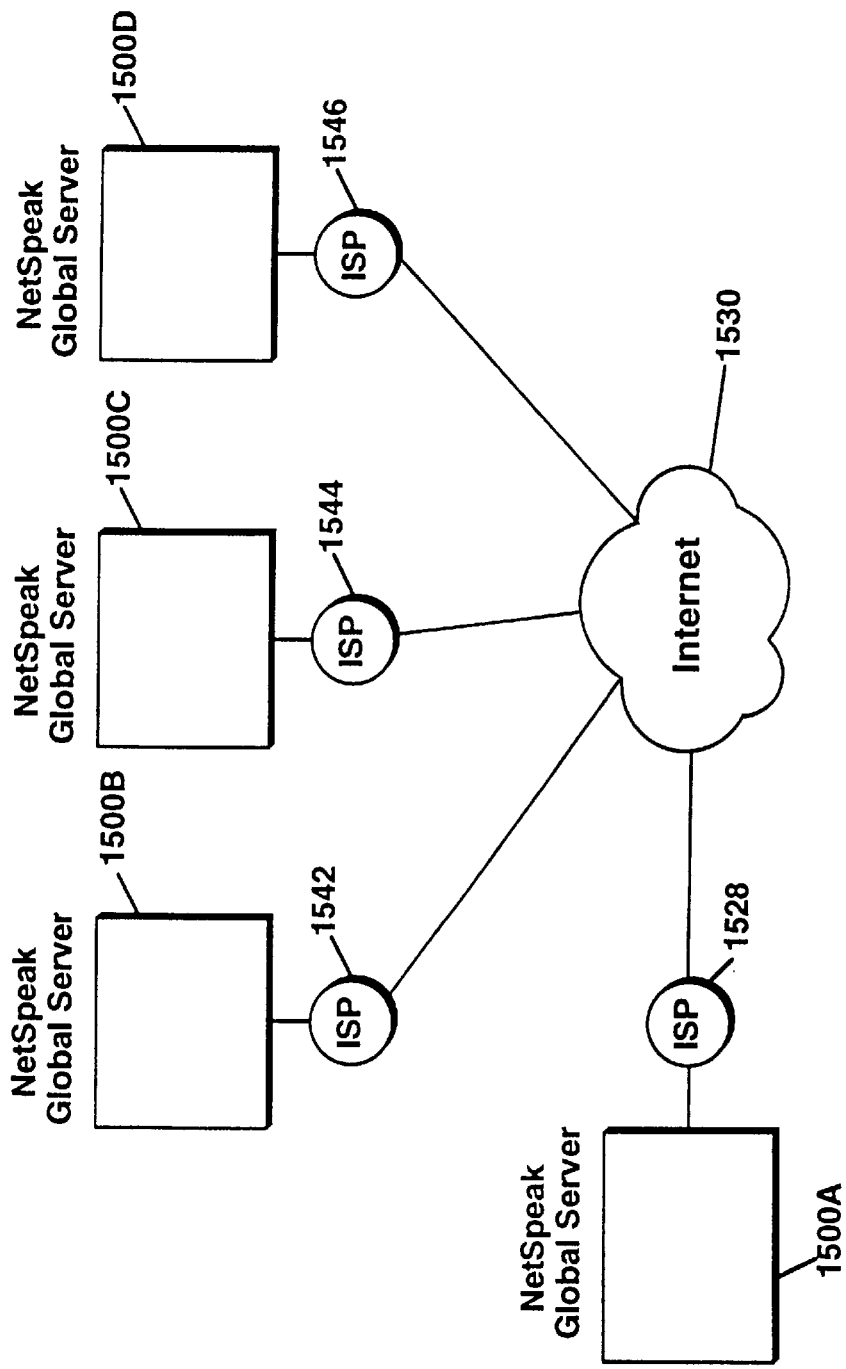

It is further contemplated within the present invention that more than one global server 1500 may be utilized, as illustrated by FIG. 15C. In this implementation, multiple global servers 1500A–D are maintained for fault tolerant load sharing, each one performing the above-described connection server, information server and database server processes. Each of global servers 1500A–D are connected to the Internet via a separate T1 or T3 connection to different Internet service providers, and are synchronized with each other via database server replication. In such an embodiment, multiple global servers may be located in close proximity or in geographically disparate locations. In such an embodiment, the WebPhone application is provided with the network address information of each global server 1500A–D. In the event that any one of the global servers initially contacted is nonresponsive the WebPhone application will attempt connection to one or more of the remaining global servers to obtain directory and information services.

Further, in an implementation with multiple global servers, if the initially contacted global server is unable to accommodate a WebPhone client request, or, is not geographically convenient, the global server can provide the network address of another global server capable of servicing the WebPhone client's request or which is logically more convenient. This process may occur during the initial log-in of the WebPhone client process, as described with references to messages 1–5 of FIG. 17A.

As previously described, if none of the global servers are available, the WebPhone application can rely on the secondary Internet Protocol technique in which a WebPhone client process sends its current dynamically assigned Internet Protocol address to a prospective WebPhone callee through an E-mail message, as described herein.

WebPhone Protocol

Prior to describing the interaction of the connection server 1512 and information server 1514 with WebPhone client processes, a description of the WebPhone protocol by which the WebPhone client processes and the global server 1500 communicate is appropriate. Tables 6–7 below illustrate the packet definitions of the packets comprising the WebPhone protocol (WPP) including the packet type, the direction and the data elements comprising each packet. In Tables 6–7 the symbol "→" indicates a packet transmitted by a WebPhone client process, while the "←" symbol indicates a packet transmitted by the global server. Tables 8–9 define the data elements described in Tables 6–7. In Tables 6–9, the terms "ULONG" and "UNSIGNED LONG" designate an unsigned long integer value, i.e., 32-bit integer value. Similarly, the terms "USHORT" and "UNSIGNED SHORT" designate an unsigned short integer value, i.e., 16-bit integer value. The term "CHAR" designates a single character, typically assuming a binary value of either 1 or 0. The term "VARCHAR(X)", where X is an integer, value symbolizes a variable length character string, with the number of characters indicated with the integer value. The term "UNSIGNED CHAR" designates an 8-bit character code, i.e., no sign bit. Finally, the term "variable" indicates a variable length data field.

Figure 17A:
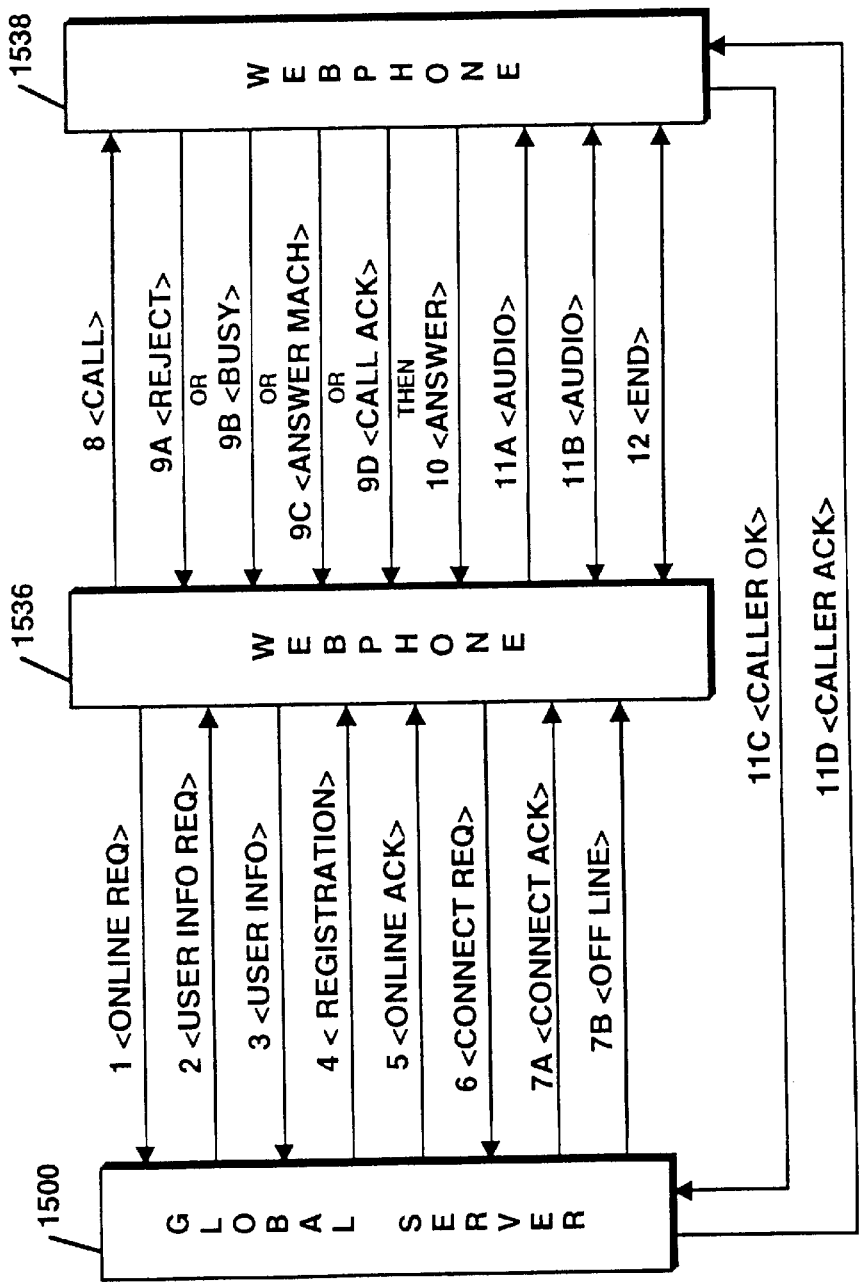
FIGS. 17A–B are schematic block diagrams illustrating packet transfer sequences in accordance with the communication protocol of the present invention.

FIG. 17A illustrates a schematic block diagram of a packet transfer sequence between a pair of WebPhone client processes and the global server, in accordance with the present invention. Each WebPhone application, also referred to as a WebPhone client process, connects to global server 1500 upon start up to inform global server 1500 that the WebPhone client process is on-line and available to make and/or receive calls. Specifically, as illustrated in FIG. 17A, WebPhone 1536 opens a socket to the global server 1500 and transmits an <ONLINE REQ> packet from WebPhone 1536 to Global server 1500, as illustrated by message 1 and FIG. 17A. The <ON LINE REQ> packet may have the format and data illustrated in Table 6, and additional Feature bits which define the functionality of the WebPhone application, as explained in greater detail hereinafter. In response, connection server 1512 and information server 1514 of global server 1500 use the information contained in the <ONLINE REQ> packet to update the status of database 1516. In the event that the WebPhone client process is logging on for the first time, global server 1500 returns to the WebPhone 1536 a <USER INFO REQ> packet, as illustrated by message 2 of FIG. 17A. The <USER INFO REQ> packet includes the elements as defined in Table 9. In response, WebPhone 1536 returns a <USER INFO> packet as illustrated by message 3 of FIG. 17A. The <USER INFO> packet contains the data elements defined in Table 8. Connection server 1512 and information server 1514 of global server 1500 utilize the data in the <USER INFO> packet to update database 1516. Specifically, information server 1514 utilizes such data to create a record in client table 1516A representing WebPhone 1536. Next, global server 1500 transmits to WebPhone 1536 a <REGISTRATION> packet, as illustrated by message 4 of FIGS. 17A. The <REGISTRATION> packet contains the data described in Table 7 plus Feature bits, as described hereinafter. The <REGISTRATION> packet returned to WebPhone 1536 enables certain functions within the WebPhone architecture based on predetermined criteria, for example, whether the user has paid for the product, or which version of the product the user possesses. Following the <REGISTRATION> packet, global server 1500 further transmits an <ONLINE ACK> packet, as illustrated by message 5 of FIG. 17A. Prior to transmission of the <ONLINE ACK> packet, connection server 1514 updates database 1516, specifically On-line table 1516B to indicate that WebPhone 1536 is on-line with respect to the computer network. Upon receiving the <ON-LINE ACK> packet, WebPhone 1536 closes the socket to global server 1500.

In the event WebPhone 1536 had previously registered with global server 1500, only messages 1 and 5 are required to establish WebPhone 1536 as being on-line. If WebPhone 1536 had new user information to supply to global server 1500, then packet sequence illustrated by messages 3 and 4 would occur.

Although the packet sequence illustrated by messages 1–5 is described with reference to WebPhone 1536, WebPhone 1538 interacts in a similar manner with global server 1500 to establish on-line status. No further interaction occurs between the respective WebPhone client processes and the global server unless the WebPhones require directory or search assistance about a prospective callee.

In one calling scenario, a WebPhone user knows the E-mail address of another WebPhone user to which he/she wishes to establish a point-to-point communication, however, the current dynamically assigned Internet protocol address of the callee is unknown to the caller. In this scenario, the user of WebPhone 1536 requests assistance from global server 1500 to obtain the current dynamically assigned Internet Protocol address of the prospective callee WebPhone. First, the user of WebPhone 1536 specifies the callee by entering all or part of the callee party's name or alias in the party name field area of the graphic user interface. If the party is not in the WebPhone user's local directory, the IP address or E-mail address of the callee WebPhone may be entered into the number field area of the graphic user interface, followed by activation of the send button or icon on the graphic user interface. As a result, WebPhone 1536 opens a socket to global server 1500 and transmits a <CONNECT REQ> packet having the format described in Table 6. Connection server 1512 of global server 1500 utilizes the value of the E-mail address specified in the <CONNECT REQ> packet to perform a one-to-one mapping in the online table 1516B to determine the current Internet Protocol address of the indicated callee, as illustrated by the flowchart of FIG. 15A. Once this mapping is performed, the server 1500 transmits to WebPhone 1536 a <CONNECT ACK> packet, as indicated by message 7A of FIG. 17A. The <CONNECT ACK> packet has the format and content as illustrated in Table 6 and includes the IP address of the callee as Well as information such as an error code to indicate that no WebPhone application is associated with that callee. Alternatively, if the selected callee is off line, global server 1500 transmits to WebPhone 1536 an <OFF LINE> packet to indicate that the desired party is not on-line, as illustrated by message 7B of FIG. 17A. Following the receipt of either a <CONNECT ACK> or an <OFF LINE> packet by WebPhone 1536, the socket to global server 1500 opened by WebPhone 1536 is closed.

If the current Internet Protocol address of the callee was returned from global server 1500, the packet transmission sequence illustrated between WebPhones 1536 and 1538 of FIG. 17A transpires. Whether a calling WebPhone knows the Internet Protocol address of the callee WebPhone, as in the case of a fixed Internet Protocol address, or obtains the Internet Protocol address from global server 1500, as previously described, the calling sequence to establish a call occurs as follows. WebPhone 1536 opens a socket to Web-Phone 1538. Next, WebPhone 1536 transmits to WebPhone 1538 a <CALL> packet as illustrated by message 8 of FIG. 16A. The <CALL> packet has the format illustrated in Table 6 and may, optionally, include information identifying the compression/decompression (codec) used by the caller Web-Phone. In response to the <CALL> packet, WebPhone 1538 may return with a number of different packets, as illustrated by messages 9A–D. First, callee WebPhone 1538 may respond to caller WebPhone 1538 with a <REJECT> packet, as illustrated by message 9A, indicating that the callee WebPhone does not wish to be disturbed, e.g. total call blocking, or, that the callee WebPhone does not wish to talk to caller WebPhone, e.g. party specific or group specific call blocking. In the event of party or group specific call blocking, the user information contained within the <CALL> packet of message 9A is compared by the caller WebPhone application to a predefined list of WebPhone user information profiles which the callee does not wish to converse, such list having been predefined by the callee in the WebPhone user's personal directory, as explained hereinafter. Upon receiving the <REJECT> packet the caller WebPhone annunciates the result to the user and the socket to the callee WebPhone is closed.

Alternatively, callee WebPhone 1538 may return a <BUSY> packet, as illustrated by message 9B of FIG. 17A. The <BUSY> packet indicates that the callee WebPhone is currently utilizing all available lines within its WebPhone application.

A further possible response from callee WebPhone 1538 is to issue an <ANSWER MACH> packet, as illustrated by message 9C of FIG. 17A. The <ANSWER MACH> packet includes data indicating whether the machine is capable of receiving voice mail type messages as described in greater detail in copending U.S. patent application Ser. No. 08/719, 898 entitled "Method and Apparatus for Providing Caller Identification Based Out-Going Messages in a Computer Telephony Environment," by Mattaway et al., commonly assigned and incorporated herein by reference.

The preferred response by callee WebPhone 1538 is to transmit a call acknowledge <CALL ACK> packet, as illustrated by message 9D of FIG. 17A. The <CALL ACK> packet has the data content illustrated in Table 6. Both the <CALL> and <CALL ACK> packets contain the information of the WebPhone users sending the packet. This information is useful by the recipient of the packet for a number of purposes. For example, the user information is displayed on the enunciator area of the WebPhone graphic display to identify the party placing the call. Second, the user may select such information and, using the drag and drop functionality of the WebPhone graphic user interface, add the user information to the callee WebPhone user's personal directory resident within his/her specific WebPhone application. In such a manner, both parties are completely identified to each other prior to commencing audio communications. The transmission of complete caller identification information with the <CALL> and <CALL ACK> symbols packets enables such functions as individual or group specific call blocking, party specific outgoing messages, visual caller identification, and party specific priority ringing and sound effects, as explained herein.

Following transmission of <CALL ACK> packet by callee WebPhone 1538, the callee WebPhone further transmits an <ANSWER> packet to caller WebPhone 1536, as illustrated by message 10 of FIG. 17A. Like the <BUSY> packet, the <ANSWER> packet is essentially empty, containing nothing more than a session ID number which is unique to the call. The socket previously opened by caller WebPhone 1536 over which the forgoing packets were transmitted remains open for the transmission of control information between caller WebPhone 1536 and callee WebPhone 1538. Such control information may comprise an <END> packet signaling the end of a call, a <HOLD> packet indicating that one of the parties to a call has placed the call "on hold" or other packets related to advance functionality of the WebPhone architecture. In addition, caller WebPhone 1536 opens a second socket to callee WebPhone 1538 over which the respective WebPhones may exchange <AUDIO> packets, as illustrated by messages 11A–B of FIG. 17A. The <AUDIO> packets have the data content illustrated in Table 6. The WebPhone application enables the parties to converse in real-time, telephone quality, encrypted audio communication over the Internet and other TCP/IP based networks. If both WebPhone client processes are utilized with full duplex sound cards, such as that illustrated in FIG. 12, the WebPhone users may transmit and receive audio packets simultaneously, similar to normal telephone conversation. However, if the WebPhone client processes are used with half duplex sound cards, a WebPhone user may only transmit or receive audio data simultaneously, similar to a speaker phone. Exchange of <AUDIO> packets continues until either the callee WebPhone or the caller WebPhone transmits an <END> packet, as illustrated by message 12 of FIG. 16A. Following the receipt of an end packet, the WebPhone client process will cease to accept subsequent audio packets.

Following either transmission or receipt of an <END> packet by the caller WebPhone, the socket opened by the caller WebPhone to the callee WebPhone over which real-time audio communication occurred is closed. Similarly, the previously opened socket over which control information was transmitted between the callee and caller WebPhones is likewise closed.

Figure 17B:
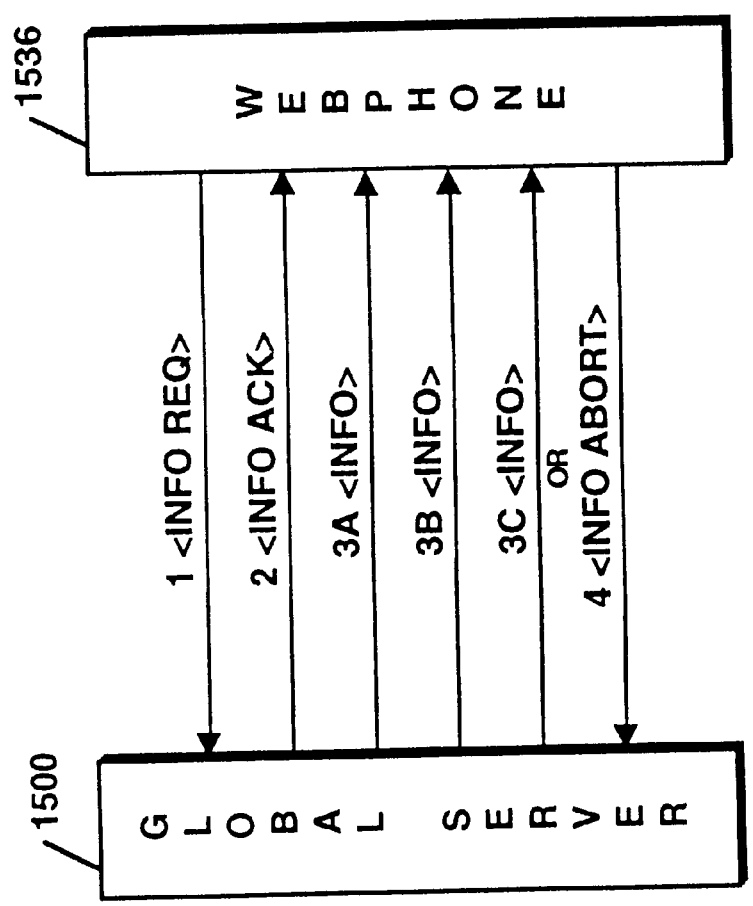

Referring now FIG. 17B, if a WebPhone caller seeks to determine whether a prospective WebPhone callee is connected to the computer network, but, has little information regarding the client process, information server 1514 may be utilized as described. The WebPhone user defines One or more of the first name, last name, company, city, state, or country values of the Query field contained within the <INFO REQ> packet sends the packet to the global server. WebPhone 1536 opens a socket to global server 1500 and forwards <INFO REQ> packet to global server 1500, as illustrated by message 1 of FIG. 17B. Information server 1514 extracts the values specified the query field of the <INFO REQ> packet and queries the database 1516, as previously described with reference to FIG. 16B. Global server 1500 then transmits a <INFO ACK> packet back to WebPhone 1536, as illustrated by message 2 of FIG. 17B. The <INFO ACK> packet has the format and data elements indicated in Table 7, including the number of parties satisfying the search criteria, specified in the <INFO REQ> packet. If the user of WebPhone 1536 wishes to receive the number of parties satisfying the search criteria global server 1500 automatically transmits to WebPhone 1536 one or more <INFO> packets, as illustrated by messages 3A–C of FIG. 17B. The <INFO> packet has the format and data elements as described in Tables 6–7. At any time following transmission of the <INFO ACK> packet, WebPhone 1536 may transmit an <INFO ABORT> packet to either prevent transmission of any <INFO> packets or to stop transmission of any remaining packets, as illustrated by message 4 of FIG. 17B. The <INFO ABORT> packet has the format and data elements as described in Table 6–7.

Once the user receives the information contained within the <INFO> packets satisfying the search criteria, the user may store such information in his/her personal WebPhone directory by dragging and dropping the information from the annunciator area to the direction dialog box using the WebPhone GUI.

The methods and apparatus described herein provide computer users with a powerful protocol in which to directly establish real-time, point-to-point communications over computer networks directly without server required linking. The a directory server assists in furnishing the current dynamically assigned internet protocol address of other similarly equipped computer users or information about such users.

Mechanism for Dynamic Monitoring of Online Status

In accordance with another aspect of the present invention, a system and method for monitoring which of a plurality of WebPhone client processes are currently connected to a computer network utilizes a server which dynamically adjust the required notification interval of the WebPhone client processes depending on the utilization of server resources.

The WebPhone application maintains an internal timer which may be derived from the system clock of the computer system on which the WebPhone process is executing. In addition, the WebPhone is provided with a default notification interval representing a fixed interval of time in which the WebPhone application reconnects to global server 1500 to inform the server that the WebPhone client process is still active, such a default value being is at the discretion of the system designer and may be, for instance, 15 minutes, 1 hour, 5 hours, etc. The construction and function of such a timer, as well as a data structure used to maintain a default notification interval, are within the scope of those reasonably skilled in the programming arts.

Following the initial online notification sequence, as previously described with reference to message 1–5 of FIG. 17A, WebPhone 1536 records the time at which the <ONLINE ACK> packet was received from global server 1500. Simultaneously, global server 1500 sets the "OnlineDate" field in the record for the WebPhone client process in Table 1516B. The OnlineDate field has the form and data type as illustrated in Table 2.

Figure 18:
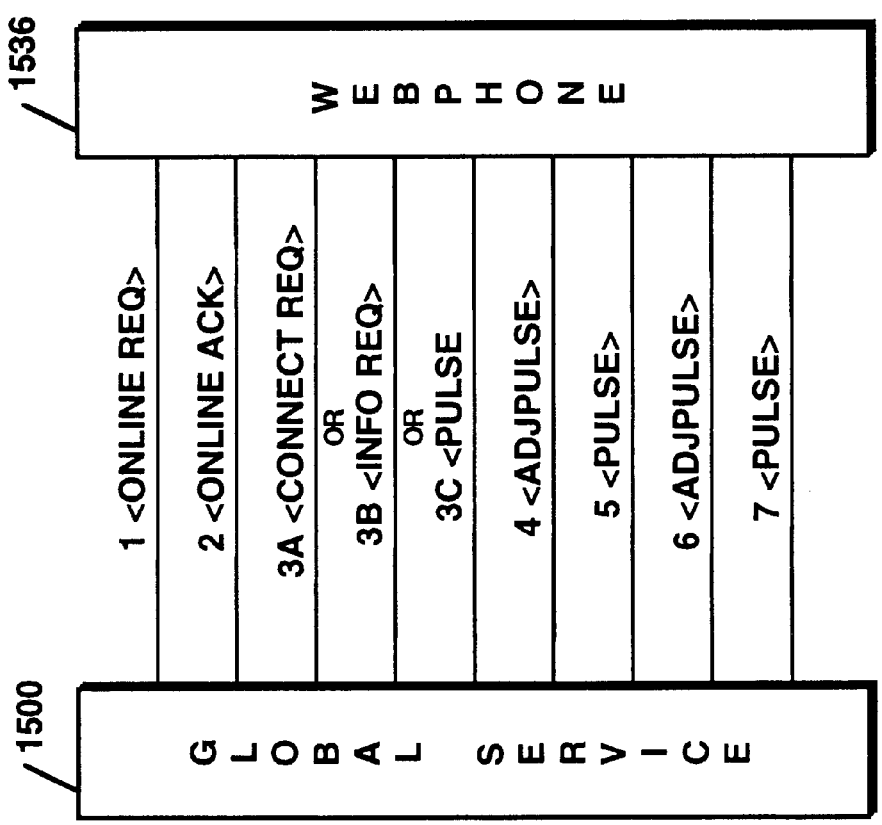
FIG. 18 is a schematic block diagram illustrating a packet transfer sequence in accordance with the communications protocol of the present invention.

Referring to FIG. 18, a schematic block diagram illustrating a packet transfer sequence in accordance With the present aspect of the invention is illustrated. Specifically, WebPhone 1536 transmit a <ONLINE REQ> packet to global server 1500 as illustrated by message 1 of FIG. 18, in a manner as previously described with regard to message 1 of FIG. 17A. Global server 1500 responds with a <ONLINE ACK> packet as illustrated by message 2 of FIG. 18, in a manner as previously described with regard to message 2 of FIG. 17A. Following the receipt of the <ONLINE ACK> packet from global server 1500, WebPhone 1536 may transmit any number of packets to the global server which will serve as notification to the server that WebPhone 1536 is still actively coupled to the computer network. As illustrated in FIG. 17B, such packets may include a <CONNECT REQ> packet, as illustrated by message by 3A, a <INFO REQ> packet, as illustrated by message 3B or a <PULSE> packet, as illustrated by message 3C, all of FIG. 18. The <CONNECT REQ> packet and the <INFO REQ> packet have been previously described with reference to FIGS. 16A–B and FIGS. 17A–B.

The <PULSE> packet has the format and data content as illustrated in Table 7, and is utilized by WebPhone server 1536 to notify global server 1500 that the WebPhone is still actively connected to the network. The <PULSE> packet is issued after predetermined periods of inactivity by WebPhone 1536. In response, global server 1500 updates the "OnlineDate" field in the appropriate record of Table 1516B to reflect recent activity from WebPhone client 1536. If the demand for server resources, i.e. the number of transmissions to global server 1500, exceeds a predetermined threshold, global server 1500 transmits to WebPhone 1536 and <ADJPULSE> packet, as illustrated by message 4 of FIG. 18. The <ADJPULSE> packet has the format and data content as illustrated in Table 7. In the illustrative embodiment the value of the "AdjPulse" field within the <ADJPULSE> packet represents an offset to the default periodic interval value within WebPhone 1536. Alternatively, the same field may represent an absolute time interval at which WebPhone 1536 notifies global server 1500 of its status. In such instance, WebPhone 1536 will use the value contained in the <ADJPULSE> packet as a temporary default until the WebPhone logs off from the computer network or receives a new <ADJPULSE> packet. If there is no further interaction between Webphone 1536 and global server 1500, WebPhone 1536 will send a subsequent <PULSE> packet to global server 1500 after expiration of the modified time interval as defined in the prior received <ADJPULSE> packet, as illustrated by message 5 of FIG. 18. If the resource demand on global server 1500 has increased or decreased since the last <PULSE> packet transmitted from WebPhone 1536, global server 1500 will update the on-line Table 1516B and select a new value for the "Adjpulse" field to be transmitted with the <ADJPULSE> packet to WebPhone 1536. The value of the field may reflect a decrease in the default periodic notification interval, i.e., indicating a reduction in server resource utilization, or, conversely, an additional increase, i.e., an even larger utilization of server resource utilization. Global server 1500 will transmit the <ADJPULSE> packet to WebPhone 1536, as illustrated by message 6 of FIG. 18. WebPhone 1536 will utilize the value contained within the <ADJPULSE> packet and, at the appropriate interval, in the absence of further interaction with global server 1500, transmit another <PULSE> packet, as illustrated by message 7 of FIG. 18.

Figure 19:
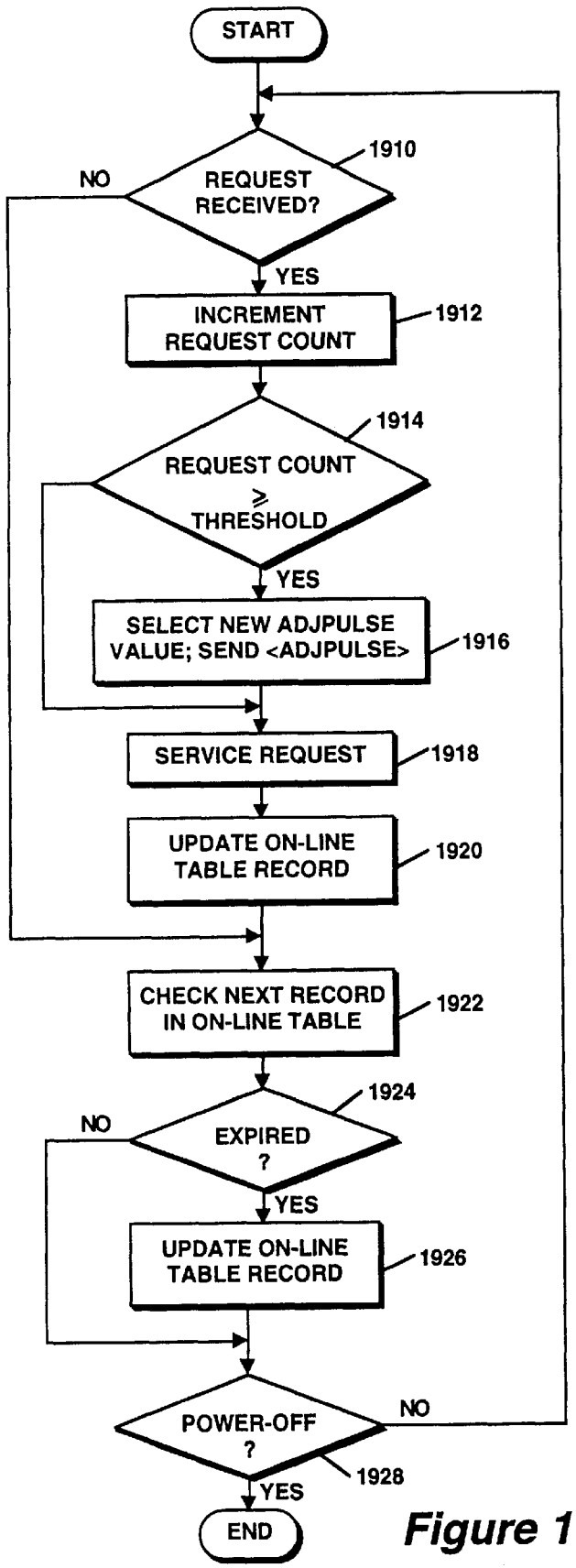
FIG. 19 is a flowchart illustrating the process steps performed by the global server in accordance with the present invention.

Referring to FIG. 19, a flowchart of the process by which global server 1500 dynamically determines whether to adjust the default period notification interval for client WebPhone processes currently connected to the network is illustrated. Global server 1500 and its subsystems, including connection server 1512, information server 1514, and database server 1518, remain in an idle state or attend to other tasks not related to the subject matter of this invention until a request from a WebPhone client process, such as WebPhone 1536 is received, as illustrated by decisional block 1910 of FIG. 19. Such a request may be in the form of any of the following packets: <ONLINE REQ>, <CONNECT REQ>, <CNF CALL>, <PULSE>, <INF REQ>, <INFO ABORT>, <USER INFO>, <CALLER OK>, <WBLIST REQ>, <WB REQ>, and <WB HIT>. Upon receipt of any of the previously described packets, global server 1500 increments the value of a Request Count variable maintained by global server 1500, as illustrated by process block 1912. In addition to the Request Count variable, global server 1500 also maintains a Threshold variable, both of which may be implemented with integer values. Global server 1500 next compares the value of the Request Count variable to the Threshold variable to determine whether or not the number of requests exceeds a previously defined level, as illustrated by decisional block 1914. If the current value of the Request Count variable exceeds that of the Threshold variable, global server 1500 will select a new value for the "Adjpulse" field to be sent with the <Adjpulse> packet to the requesting WebPhone 1536, as illustrated by procedural block 1916. The process of selecting a new value for the Adjpulse field may be implemented in global server 1500 by computing a Difference value between the Request Count variable and the Threshold variable and comparing the Difference value to a table of predefined Difference values, each having associated therewith a distinct value for the Adjpulse field. By successively comparing the Difference value with the predetermined values in the table, typically using less than or greater than comparisons, a new and appropriate Adjpulse value may be selected. The data structures necessary to implement such a table, as well as the code necessary to perform such calculations and comparisons are within the scope of those skilled in the programming arts and will not be defined in greater detail hereinafter. Further, global server 1500 transmits to WebPhone 1536 an <ADJPULSE> packet containing the new value of the Adjpulse field, in a manner similar to that described with reference to message 4 of FIG. 18.

Next, global server 1500 services the request for WebPhone 1536 depending on the nature of the packet received, as illustrated in FIG. 1918, such servicing activity not being pertinent to the present discussion. Following servicing of the request, global server 1500 updates the record for WebPhone 1536 in On-line Table 1516B, particularly the onlineDate field, as illustrated by procedural block 1920. It will be obvious to those reasonably skilled in the programming arts that the sequence of procedure blocks 1918 and 1920 may be reversed without significantly affecting the implementation or desired results of the invention described herein.

Following the updating of On-line Table 1516B, global server 1500 attends to monitoring of the On-line Table 1516B to determine if any record entries contained therein should be removed, i.e., have expired due to inactivity, as illustrated by procedural block 1922. Specifically, global server 1500 utilizes the current value of the onlineDate field of the relevant record contained in Table 1516B and the current value of the Adjpulse field to determine whether the relevant WebPhone client process has been inactive. This determination may be performed by comparing the sum of the onlineDate value and the Adjpulse value to the current time. If the current time is greater, the Webphone client process is expired. The determination of whether a particular WebPhone client process is no longer active is represented by decisional block 1924 of FIG. 19. If global server 1500 determines that the relevant WebPhone client process is no longer active, the server will update the On-line Table 1516B by either marking the relevant record as no longer valid or deleting the record entirely from the On-line Table, as represented by procedural block 1926 of FIG. 19. If global server 1500 determines that the relevant WebPhone client process record has not yet expired then the global server will, absent a power-off signal, attend to servicing requests, as illustrated by decisional blocks 1924 and 1928 of FIG. 19.

In the manner described above with reference to FIGS. 17B–19, the global server is able to accurately track which WebPhone client processes are active and currently coupled to the computer network, despite increased server activity. It will be obvious to those skilled in the arts that the actual implementation of the process described with reference to FIG. 19 may be embodied in connection server 1512, information server 1514, database server 1518, or, for the system described in FIG. 15B, as a separate server system entirely.

In an alternate embodiment, the various aspects of the invention may be implemented as a computer program product for use with a computer system. Such implementation may comprise a series of computer instructions either fixed on a tangible medium, such as a computer readable media, e.g. diskette 1142, CD-ROM 1147, ROM 1115, or fixed disk 1152 of FIG. 11, or transmittable to a computer system, via a modem or other interface device, such as communications adapter 1190 connected to the network 1195 over a medium 1191. Medium 1191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skill in the art that various changes and modifications can be made which will achieve some of the advantages of the invention without departing from the spirit and scope of the invention. These and other obvious modifications are intended to be covered by the appended claims.

TABLE 1

Client Table

| Field | Data Type | Comments |
| --- | --- | --- |
| id | ulong | Unique ID Sequence |
| activated | char | 0 = NO, 1 = YES |
| activationDate | ulong | Secs since 00:00 UTC Jan 1, 1970 |
| version capability | ushort | Version of the Webphone |
| version protocol | ushort | |
| version vendor | ushort | |
| paid | char | 0 = NO, 1 = YES |
| prePaidCode | varchar(16) | |
| firstName | varchar(10) | |
| lastName | varchar(25) | |
| alias | varchar(20) | |
| emailAddr | varchar(90) | |
| IPAddr | varchar(80) | 0.0.0.0 if not known |
| street | varchar(50) | |
| apt | varchar(5) | |
| city | varchar(20) | |
| state | varchar(20) | |
| country | varchar(20) | |
| postalCode | varchar(20) | |
| phone | varchar(25) | |
| fax | varchar(25) | |
| feature bits | ulong | WebPhone Feature Definitions |
| company | varchar(25) | Company Name |
| addrChanges | char | No. of address changes |
| addrChangeDate | ulong | Secs since 00:00 UTC |
| publish | char | 0 = NO, 1 = YES |
| accessDate | ulong | Secs since 00:00 UTC |
| accessCount | ulong | # of log ons |
| callCount | ulong | # of outbound calls |
| social security number | ulong | optional |
| age | ushort | optional |
| occupation code | ushort | optional |
| interest codes | ushort | optional |
| household income range | ushort | optional |

TABLE 2

Online Table

| Field | Data Type | Comments |
| --- | --- | --- |
| emailAddr | varchar(90) | |
| IPAddr | varchar(80) | |
| flags | char | |
| onlineDate | ulong | Secs since 00:00 UTC |

TABLE 3

WebBoard Table

| Field | Data Type | Comments |
| --- | --- | --- |
| id | ulong | Unique ID Sequence |
| image | varchar(255) | Filename of image file |
| imageType | char | GIF = 0, JPG = 1, RLE = 3 |
| audio | varchar(255) | Filename of TSP encoded.WAV file |

TABLE 3-continued

WebBoard Table

| Field | Data Type | Comments |
|---|---|---|
| audioType | char | GSM = 0, TRUESPEECH = 1 |
| hits | ulong | Number of accrued hits |
| hitsprofile | varchar(8) | Filename of Demographics |
| version | ulong | version of WebBoard |
| URL | varchar(255) | home page url |

TABLE 4

WebBoard Config Table

| Field | Data Type | Comments |
|---|---|---|
| count | ulong | Number of WebBoards |

TABLE 5

Source Table

| Field | Data Type | Comments |
|---|---|---|
| id | ulong | Unique ID Sequence |
| weboardID | ulong | Link to WebBoard record |
| name | varchar(50) | Company's name |
| url | varchar(80) | URL to Home Page |
| street | varchar(50) | |
| apt | varchar(5) | |
| city | varchar(20) | |
| state | varchar(20) | |
| country | varchar(20) | |
| postalCode | varchar(20) | |
| phone | varchar(25) | |
| fax | varchar(25) | |
| contact | varchar(35) | Name of contact |

TABLE 6

WebPhone Protocol (WPP) Packet Definitions

| Packet | Packet Type | Direction | Data |
|---|---|---|---|
| Invalid | WPP_INVALID | ←→ | WPP_INVALID |
| Online Req | WPP_ONLINEREQ | → | WPP_ONLINEREQ, sid, version, emailAddr, IPAddr, onlineState, feature bits |
| OnlineACK | WPP ONLINEACK | ← | WPP_ONLINEACK, sid onlineStatus, feature bits |
| Offline | WPP_OFFLINE | ←→ | WPP_OFFLINE, sid |
| Hello | WPP_HELLO | ←→ | WPP_HELLO, sid, version |
| ConnectReq | WPP_CONNECTREQ | → | WPP_CONNECTREQ, sid, version, callType, partyEmailAddr, emailAddr, IPAddr, connectState |
| Connect ACK | WPP_CONNECTACK | ←→ | WPP_CONNECTACK, sid, connectStatus, partyIPaddr |

TABLE 6-continued

WebPhone Protocol (WPP) Packet Definitions

| Packet | Packet Type | Direction | Data |
|---|---|---|---|
| Call | WPP_CALL | ←→ | WPP CALL, sid, version, emailAddr, IPAddr, userInfo |
| CallACK | WPP_CALLACK | ←→ | WPP_CALLACK, sid, version, emailAddr, IpAddr, userInfo |
| CnfCall | WPP_CNFCALL | ←→ | WPP_CNFCALL, sid, version, emailAddr, IPAddr, userInfo |
| CnfCallACK | WPP_CNFCALLACK | ←→ | WPP_CNFCALLACK, sid, version |
| Answer | WPP_ANSWER | ←→ | WPP_ANSWER, sid |
| Busy | WPP_BUSY | ←→ | WPP_BUSY, sid |
| AnsMachine | WPP_ANSMACH | ←→ | WPP_ANSMACH, sid, state |
| End | WPP_END | ←→ | WPP_END, sid |
| Hold | WPP_HOLD | ←→ | WPP_HOLD, SID, (ON/OFF) |
| Reject | WPP_REJECT | ←→ | WPP_REJECT, sid |
| Camp | WPP_CAMP | ←→ | WPP_CAMP, sid |
| CampACK | WPP_CAMPACK | ←→ | WPP_CAMPACK, sid |
| Audio | WPP_AUDIO | ←→ | WPP_AUDIO, sid, audioType, silence, length, audioData |
| Pulse | WPP_PULSE | → | WPP_PULSE, sid |
| Adjpulse | WPP_PULSE | ← | WPP_ADJPULSE, sid, adjPulse |
| Vmail | WPP_VMAIL | ←→ | WPP_VMAIL, sid, audioType, silence, length, audioData |
| VmailEnd | WPP_VMAILEND | ←→ | WPP_VMAILEND, sid |
| OgmEnd | WPP_OGMEND | ←→ | WPP_OGMEND, sid |
| CnfAdd | WPP_CNFADD | ←→ | WPP_CNFADD, sid, partyEmailAddr, partyIPaddr, partInfo |
| CnfDrop | WPP_CNFDROP | ←→ | WPP_CNFDROP, sid |
| FileXmtReq | WPP_FILEXMTREQ | ←→ | WPP_FILEXMTREQ, sid, file Type, fileName, fileSize |

TABLE 7

WebPhone Protocol (WPP) Packet Definitions

| Packet | Packet Type | Direction | Data |
|---|---|---|---|
| FileXmtAck | WPP_FILEXMTACK | ←→ | WPP_FILEXMTACK, sid |
| File | WPP_FILE | ←→ | WPP_FILE, sid, length, fileData |
| FileXmtEnd | WPP_FILEXMTEND | ←→ | WPP_FILEXMTEND, sid |
| FileXmtAbort | WPP_FILEXMTABORT | ←→ | WPP_FILEXMTABORT, sid |
| InfoReq | WPP_INFOREQ | → | WPP_INFOREQ, sid, query |
| InfoACK | WPP_INFOACK | ← | WPP_INFOACK, sid, nparties |
| Info | WPP_INFO | ← | WPP_INFO, sid, partyInfo |
| InfoAbort | WPP_INFOABORT | → | WPP_INFOABORT, sid |
| UserInfoReq | WPP_USRINFOREQ | ← | WPP_USRINFOREQ, sid |
| UserInfo | WPP_USRINFO | → | WPP_USRINFO, sid, version, userInfo |
| WBImageStart | WPP_WBIMAGESTART | ← | WPP_WBIMAGESTART, sid, fileSize, imageType, url |
| WBImage | WPP_WBIMAGE | ← | WPP_WBIMAGE, sid, length, imageData |
| WBImageEnd | WPP_WBIMAGEEND | ← | WPP_WBIMAGEEND, sid |
| WBAudioStart | WPP_WBAUDIOSTART | ← | WPP_WBAUDIOSTART, sid, fileSize, audioType |
| WBAudio | WPP_WBAUDIO | ← | WPP_WBAUDIO, sid, length, audioData |
| WBAudioEnd | WPP_WBAUDIOEND | ← | WPP_WBAUDIOEND, sid |
| Registration | WPP_REG | ← | WPP_REG, sid, feature bits, EEMAILAddr, customer id |
| Audio Start | WPP_AUDIO START | ←→ | WPP_AUDIO START, sid |
| Audio End | WPP_AUDIO END | ←→ | WPP_AUDIO END, sid |
| Caller OK | WPP_CALLEROK | → | WPP_CALLEROK, sid, version, emailAddr, feature bits |
| Caller ACK | WPP_CALLERACK | ← | WPP_CALLERACK, sid, callerStatus, feature bits |
| Key Pad | WPP_KEYPAD | ← | WPP_KEYPAD, sid (ON/OFF) |
| Key | WPP_KEY | → | WPP_KEY, sid, ascii character |
| WBLIST | WPP_WBLIST | ← | WPP_WBLIST, sid, list of WB IDs |
| WBLIST REQ | WPP_WBLISTREQ | → | WPP_BBLISTREQ, sid |
| WB REQ | WPP_WEBBOARDREQ | → | WPP_WEBBOARDREQ, sid, WBid, Client id |
| WB HIT | WPP_WEBBOARDHIT | → | WPP_WWBOARDHIT, sid, WB id, Client id |
| ANS FULL | WPP_ANS FULL | → | WPP_ANS FULL, sid |

TABLE 8

WebPhone Protocol (WPP) Packet Data Definitions

| Element | Data Type | Comment |
|---|---|---|
| WPP_* | unsigned char | WPP message identifier |
| sid | unsigned long | session id unique per call |
| version | unsigned(3) | version of the webphone (capability, protocol, vendor) |
| emailAddr | varchar(90) | email address of caller |
| IPAddr | varchar(80) | IP Address |
| onlineState | unsigned char | bit 0 (ACTIVE/INACTIVE) bit 1 (Merchant Phone) bit 2 (Connection Server) bit 3 (webboard disabled) bit 4 Not Used bit 5 Not Used bit 6 Not Used bit 7 Not Used |
| call Type | unsigned char | call type 0: EMAIL/1:IPCALL |
| partyEmailAddr | varchar(90) | email address of person to call |
| connectStatus | unsigned char | 0:NO WEBPHONE 1:ONLINE 2:OFFLINE 3:RECONNECT 4:PERM_RECONNECT |
| partyIPAddr | varchar(80) | IP Address of person to call |
| userInfo | varchar(120) | firstName, LastName, alias, emailAddr, street, apt, city, state, country, postalCode, phone, fax, company |
| audioType | unsigned char | audio compress type 0:GSM 1:TRUESPEECH |

TABLE 9

WebPhone Protocol (WPP) Packet Data Definitions

| Element | Data Type | Comment |
|---|---|---|
| length | unsigned short | length of audio or data in bytes |
| audioData | 512 Bytes | compressed audio data |
| feature bits | unsigned long | WebPhone feature definition |
| fileType | unsigned char | file type 0:DATA 1:EMAIL 2:TEXT 3:BINARY |
| fileName | varchar(13) | name of file to be transmitted. |
| fileSize | unsigned long | size of file to be transmitted in bytes |
| fileData | variable | file data |
| query | varchar(120) | firstName, lastName, company, city, state, country |

TABLE 9-continued

WebPhone Protocol (WPP) Packet Data Definitions

| Element | Data Type | Comment |
|---|---|---|
| nparties | unsigned long | number of parties or query records being sent |
| size | unsigned long | size of file (IMAGE or AUDIO) to be sent |
| imageType | unsigned char | image type<br>0:GIF<br>1:JPG |
| imageData | 512 Bytes | image data |
| eemailAddr | varchar(90) | encrypted email Address |
| onlineStatus | unsigned char | 0 OK<br>−1 Error |
| callerStatus | unsigned char | 0 is unpaid<br>1 if paid |
| onlineState | unsigned char | bit 0 webboard disabled<br>bit 1 Not Used<br>bit 2 Not Used<br>bit 3 Not Used<br>bit 4 Not Used<br>bit 5 Not Used<br>bit 6 Not Used<br>bit 7 Not Used |
| WBid | unsigned long | link to WebBoard record |
| adjpulse | unsigned long | timer offset in secs |

TABLE 10

Feature Definition

```
feature bit 0  0 = 1 line                              1 = 4 lines
         bit 1  0 = Limited Call Time                   1 = Unrestricted Call Time
         bit 2  0 = Limited VMail OGM                   1 = Unlimited Vmail OGM
         bit 3  0 = Limited Directory Entries           1 = Unlimited Dir Entries
         bit 4  0 = Webboard Not Disabled               1 = Allowed to Disable
         bit 5  0 = Conferencing(audio) Disabled        1 = Conferencing Enabled
         bit 6  0 = Conferencing(video) Disabled        1 = Conferencing Enabled
         bit 7  0 = Whiteboard Disabled                 1 = Whiteboard Enabled
         bit 8  0 = Offline voicemail Disabled          1 = Offline voicemail Enabled
         bit 9–27 Reserved
         bit 28–30 Type of Phone
                          0 - Normal webphone
                          1 - Agent
                          2 - Business webphone
                          3 - Gateway
                          4 - ACD
                          5–7 reserved
         bit 31 1 = Disable all WebPhone features
```

TABLE 11

| Offset | Name | Size | Description |
|---|---|---|---|
|  | Reserved |  | Reserved |
| +1 | SessionID | 4 | Unique value for duration of this connection |
| +5 | Version | 6 | WebPhone version and distributor stamp |
| +11 | Codec | 1 | Audio compression algorithm selected |
| +12 | FirstName | 10 | Given name, middle initial |
| +22 | LastName | 25 | Surname |
| +47 | Alias | 20 | Nickname |
| +67 | EmailAddr | 90 | Caller's electronic mail address |
| +157 | IpAddr | 80 | Caller's WebPhone's Internet address |
| +237 | Street | 50 | Street address of user |
| +287 | Apt | 20 | Apartment or suite number |
| +307 | City | 20 | City name |
| +327 | State | 20 | State or province |
| +347 | Country | 20 | Country name |
| +367 | ZipCode | 20 | Zip or postal code |
| +387 | Phone | 25 | Telephone number |
| +412 | Fax | 25 | Facsimile telephone number |
| +437 | Company | 25 | Employer or organization name |
| +487 | File Name | 25 | Name of file |
| +512 | Action Code | 25 | Action descriptor |
| +537 | File Type | 10 | File type descriptor |
| +547 | Status | 25 | Status of WebPhone utility |

What is claimed is:

1. In a server process capable of responding to requests from one or more client processes operatively coupled to the server process over a computer network, a method of monitoring the status of a client process, comprising the steps of:

A. receiving notification from a client process that the client process is active;

B. determining that the client process is inactive if a subsequent notification from the client process is not received within a predetermined time interval;

C. monitoring a number of requests from a plurality of active client processes coupled to the server over the computer network; and D. increasing the predetermined time interval if the number of requests from the plurality of active client processes at least equals a predetermined threshold.

2. The method of claim 1 wherein step A comprises the step of:

A.1 maintaining a list of client processes.

3. The method of claim 2 wherein step A further comprises the step of:

A.2 associating an indicator with one of the plurality of client processes indicating that the client process is active, upon receiving notification from the client process.

4. The method of claim 3 wherein step A further comprises:

A.3 associating a value with one of the plurality of client processes indicating the time at which notification was received from the client process.

5. The method of claim 4 further comprising:

B.1 computing the difference between the time value associated with a client processes and a value representing the present time; and B.2 comparing the difference value to the predetermined time interval.

6. The method of claim 1 further comprising:

B.1 determining that the client process is inactive if a subsequent notification is not received from the client process within the modified predetermined time interval.

7. The method of claim 1 further comprising:

E. transmitting the modified predetermined time interval to one or more of the client processes operatively coupled to the server.

8. The method of claim 7 wherein step B further comprises the step of:

B.3 determining that the client process is inactive if a subsequent notification is not received within the modified predetermined time interval.

9. A computer program product for use with a computer server operatively coupled to one or more client processes over a computer network, the server capable of responding to requests from the client processes, the computer program product comprising a computer useable medium having program code embodied therein comprising:

program code for receiving notification from a client process that the client process is active;

program code for determining that the client process is inactive if a subsequent notification is not received within a predetermined time interval;

program code for monitoring a number of requests from a plurality of client processes operatively coupled to the server; and program code for modifying the predetermined time interval, if the number of requests from the plurality of client processes at least equals a predetermined threshold.

10. The computer program product of claim 9 wherein the program code for determining that the client process is inactive further comprises:

program code, responsive to the modified predetermined time interval, for transmitting the modified predetermined time interval to active client processes over the computer network.

11. The computer program product of claim 10 wherein the program code for determining that the client process is inactive further comprises:

program code for determining that a client process is inactive if a subsequent notification is not received from the client process within the modified predetermined time interval.

12. A computer program product for use with a computer system operatively coupled to a server process over a computer network, the computer system capable of executing one or more client processes, the computer program product comprising a computer useable medium having program code embodied therein comprising:

program code for connecting to the server process over the computer network;

program code for receiving from the server process data defining a predetermined time interval within which to notifying the server process that a client process is active;

program code for notifying the server process within the predetermined time interval that a client process is active; and program code for subsequently notifying the server process at predetermined time intervals that the client process is still active; and program code for receiving a modified predetermined time interval from the server process.

13. The computer program product of claim 12 further comprising:

program code, responsive to the modified predetermined time interval, for transmitting a subsequent notification to the server process within the modified predetermined time interval that the client process is still active.

14. A computer data signal embodied in a carrier wave comprising:

program code for receiving notification from a client process that the client process is active;

program code for determining that the client process is inactive if a subsequent notification is not received within a predetermined time interval;

program code for monitoring a number of requests from a plurality of client processes operatively coupled to the server; and program code for modifying the predetermined time interval, if the number of requests from the plurality of client processes at least equals a predetermined threshold.

15. The computer data signal of claim 14 wherein the program code for determining that the client process is inactive further comprises:

program code, responsive to the modified predetermined time interval, for transmitting the modified predetermined time interval to active client processes over the computer network.

16. The computer data signal of claim 15 wherein the program code for determining that the client process is inactive further comprises:

program code for determining that a client process is inactive if a subsequent notification is not received from the client process within the modified predetermined time interval.

* * * * *